US012713495B2

(12) United States Patent
Saggar et al.

(10) Patent No.: US 12,713,495 B2
(45) Date of Patent: Aug. 18, 2026

(54) DISCONTINUOUS RECEPTION CONFIGURATIONS FOR WAKE-UP SIGNAL MONITORING

(71) Applicant: QUALCOMM Incorporated, San Diego, CA (US)

(72) Inventors: Hemant Saggar, San Diego, CA (US); Igor Gutman, Hod HaSharon (IL); Sony Akkarakaran, Poway, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/394,631

(22) Filed: Dec. 22, 2023

(65) Prior Publication Data

US 2025/0212288 A1 Jun. 26, 2025

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01); *H04W 52/0235* (2013.01)

(58) Field of Classification Search
CPC ............. H04W 76/28; H04W 52/0216; H04W 52/0235; H04W 52/0229; H04W 72/23; H04W 52/0219; H04W 76/27; H04W 72/25; H04W 48/10; H04W 72/232; H04W 76/14; H04W 52/02; H04W 52/0225; H04W 52/028; H04W 24/10; H04W 4/70; H04W 76/40; H04W 52/0212; H04W 28/0268; H04W 4/08; H04W 72/0453;
(Continued)

(56) References Cited

U.S. PATENT DOCUMENTS

2012/0263088 A1* 10/2012 Terry ................ H04W 52/0212 370/311
2020/0045768 A1* 2/2020 He ........................ H04W 76/28
(Continued)

FOREIGN PATENT DOCUMENTS

EP 3905793 A1 11/2021
WO WO-2023044797 A1 3/2023

OTHER PUBLICATIONS

International Search Report and Written Opinion—PCT/US2024/059003—ISA/EPO—Apr. 1, 2025.

*Primary Examiner* — Nimesh Patel
(74) *Attorney, Agent, or Firm* — Holland & Hart LLP

(57) ABSTRACT

Methods, systems, and devices for wireless communications are described. A user equipment (UE) may receive, such as from a network entity, control signaling that indicates multiple discontinuous reception (DRX) configurations for the UE, where the multiple DRX configurations include a first DRX configuration associated with a first set of wake-up signal monitoring occasions and a second DRX configuration associated with a second set of wake-up signal monitoring occasions. The first DRX configuration and the second DRX configuration may both be active during a time period. The UE may monitor, during the time period, the first set of wake-up signal monitoring occasions in accordance with the first DRX configuration and the second set of wake-up signal monitoring occasions in accordance with the second DRX configuration.

30 Claims, 17 Drawing Sheets

(58) Field of Classification Search
CPC . H04W 48/12; H04W 52/0274; H04W 72/04; H04W 72/20; H04W 72/535; H04W 72/121; H04W 72/1268; H04W 72/54; H04W 72/40; H04W 12/08; H04W 16/28; H04W 28/0289; H04W 28/20; H04W 74/004; H04W 92/18; H04W 4/06; H04W 60/04; H04W 72/30; H04W 72/02; H04W 52/0248; H04W 72/21; H04W 72/542; H04W 76/38; H04W 72/563; Y02D 30/70; Y02D 30/00; H04L 5/0053; H04L 5/0048; H04L 5/001; H04L 1/1848; H04L 1/188; H04L 1/1883; H04L 5/0057; H04L 1/1887; H04L 5/0023; H04L 5/0037; H04L 25/0204; H04L 25/0224; H04L 41/16; H04L 25/0226; H04L 5/0005; H04L 5/006; H04L 1/1812; H04L 2001/0093; H04L 5/0055; H04L 12/189; H04L 1/1896; H04L 1/1854; H04L 1/189; H04L 1/1819; H04L 1/1861; H04L 5/0098; H04L 2001/0097; H04L 45/851; H04L 5/16; H04L 5/14; H04B 1/38; H04B 7/0626; H04B 7/0695; H04B 7/15528; H04B 7/026; H04B 7/0617; H04B 7/088; H04B 7/06952; H04B 7/0696; H04B 17/328; H04B 17/318; H04B 7/06954; H04B 7/0408; H04B 17/309; H04B 17/382; H04B 7/0814; H04B 7/0452; H04J 11/00; H04J 11/0069; H04J 11/0073; H04J 11/0076; H04J 11/0079; H04J 2011/0096; H04J 2211/005; G01S 11/06; G01S 2205/008; G01S 5/0063; G01S 5/02
See application file for complete search history.

(56) References Cited

U.S. PATENT DOCUMENTS

| | | | | |
|---|---|---|---|---|
| 2021/0337409 | A1* | 10/2021 | Xue | H04W 52/0216 |
| 2021/0368444 | A1* | 11/2021 | Wang | H04W 52/0232 |
| 2023/0033440 | A1* | 2/2023 | Kadiri | H04W 76/28 |
| 2023/0239794 | A1* | 7/2023 | Bao | H04W 52/0235 370/311 |
| 2023/0363051 | A1* | 11/2023 | Liu | H04W 52/0248 |

* cited by examiner

DISCONTINUOUS RECEPTION CONFIGURATIONS FOR WAKE-UP SIGNAL MONITORING

FIELD OF TECHNOLOGY

The following relates to wireless communications, including discontinuous reception configurations for wake-up signal monitoring.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may monitor for messages, such as from a network entity, at varying intervals, or cycles. In some examples, the cycles may include a wake period and an idle period. Such cycles may be configured by the network.

SUMMARY

The described techniques relate to improved methods, systems, devices, and apparatuses that support discontinuous reception (DRX) configurations for wake-up signal (WUS) monitoring. For example, the described techniques provide for a user equipment (UE) receiving, such as from a network entity, control signaling that indicates multiple DRX configurations for the UE. The multiple DRX configurations may include a first DRX configuration associated with a first set of WUS monitoring occasions and a second DRX configuration associated with a second set of WUS monitoring occasions, where the first DRX configuration and the second DRX configuration are both active during a time period. The UE may monitor, during the time period, the first set of WUS monitoring occasions in accordance with the first DRX configuration and the second set of WUS monitoring occasions in accordance with the second DRX configuration. In some examples, the first set of WUS monitoring occasions associated with the first DRX configuration have a first periodicity and the second set of WUS monitoring occasions associated with the second DRX configuration have a second periodicity, where the second periodicity is different than the first periodicity.

A method for wireless communications by a UE is described. The method may include receiving control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period, monitoring, during the time period, the first set of WUS monitoring occasions in accordance with the first DRX configuration, and monitoring, during the time period, the second set of WUS monitoring occasions in accordance with the first DRX configuration.

A UE for wireless communications is described. The UE may include one or more memories storing processor executable code, and one or more processors coupled with the one or more memories. The one or more processors may individually or collectively be operable to execute the code to cause the UE to receive control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period, monitor, during the time period, the first set of WUS monitoring occasions in accordance with the first DRX configuration, and monitor, during the time period, the second set of WUS monitoring occasions in accordance with the first DRX configuration.

Another UE for wireless communications is described. The UE may include means for receiving control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period, means for monitoring, during the time period, the first set of WUS monitoring occasions in accordance with the first DRX configuration, and means for monitoring, during the time period, the second set of WUS monitoring occasions in accordance with the first DRX configuration.

A non-transitory computer-readable medium storing code for wireless communications is described. The code may include instructions executable by one or more processors to receive control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period, monitor, during the time period, the first set of WUS monitoring occasions in accordance with the first DRX configuration, and monitor, during the time period, the second set of WUS monitoring occasions in accordance with the first DRX configuration.

In some examples of the method, UEs, and non-transitory computer-readable medium described herein, the first set of WUS monitoring occasions associated with the first DRX configuration may have a first periodicity and the second set of WUS monitoring occasions associated with the second DRX configuration may have a second periodicity, the second periodicity different than the first periodicity.

In some examples of the method, UEs, and non-transitory computer-readable medium described herein, a timeline for the first set of WUS monitoring occasions associated with the first DRX configuration may be based on a first timing offset relative to a reference time and a timeline for the second set of WUS monitoring occasions associated with the second DRX configuration may be based on a second timing offset relative to the reference time, the second timing offset different than the first timing offset.

In some examples of the method, UEs, and non-transitory computer-readable medium described herein, the first set of WUS monitoring occasions associated with the first DRX configuration may be associated with a first timer duration and the second set of WUS monitoring occasions associated with the second DRX configuration may be associated with a second timer duration, the second timer duration different than the first timer duration.

In some examples of the method, UEs, and non-transitory computer-readable medium described herein, the first timer duration and the second timer duration may be for a same type of timer, the type of timer including an inactivity timer, a monitoring duration timer, an active duration timer, an offset timer, an uplink hybrid automatic repeat request timer, a downlink hybrid automatic repeat request timer, an uplink retransmission timer, or a downlink retransmission timer.

In some examples of the method, UEs, and non-transitory computer-readable medium described herein, the first set of WUS monitoring occasions associated with the first DRX configuration each may have a first duration and the second set of WUS monitoring occasions associated with the second DRX configuration each may have a second duration, the second duration different than the first duration.

In some examples of the method, UEs, and non-transitory computer-readable medium described herein, the first set of WUS monitoring occasions associated with the first DRX configuration may be associated with a first WUS index and the second set of WUS monitoring occasions associated with the second DRX configuration may be associated with a second WUS index, the second WUS index different than the first WUS index, monitoring the first set of WUS monitoring occasions includes monitoring for one or more first WUSs corresponding to the first WUS index, and monitoring the second set of WUS monitoring occasions includes monitoring for one or more second WUSs corresponding to the second WUS index.

In some examples of the method, UEs, and non-transitory computer-readable medium described herein, the first set of WUS monitoring occasions associated with the first DRX configuration may be associated with a first transmission configuration indication state and the second set of WUS monitoring occasions associated with the second DRX configuration may be associated with a second transmission configuration indication state, the second transmission configuration indication state different than the first transmission configuration indication state.

In some examples of the method, UEs, and non-transitory computer-readable medium described herein, the first set of WUS monitoring occasions associated with the first DRX configuration may be associated with a first WUS bandwidth and the second set of WUS monitoring occasions associated with the second DRX configuration may be associated with a second WUS bandwidth, the second WUS bandwidth different than the first WUS bandwidth.

Some examples of the method, UEs, and non-transitory computer-readable medium described herein may further include operations, features, means, or instructions for identifying that a first WUS monitoring occasion included in the first set of WUS monitoring occasions associated with the first DRX configuration overlaps in time with a second WUS monitoring occasion included in the second set of WUS monitoring occasions associated with the second DRX configuration and monitoring the first WUS monitoring occasion, while refraining from monitoring the second WUS monitoring occasion, based on a priority of the first WUS monitoring occasion being higher than a priority of the second WUS monitoring occasion.

In some examples of the method, UEs, and non-transitory computer-readable medium described herein, the multiple DRX configurations further include a third DRX configuration associated with a third set of WUS monitoring occasions and the third DRX configuration may be also active during the time period.

In some examples of the method, UEs, and non-transitory computer-readable medium described herein, the first set of occasions and the second set of occasions may be associated with a same frequency range.

In some examples of the method, UEs, and non-transitory computer-readable medium described herein, the UE includes a first radio and a second radio associated with lower active power consumption than the first radio and monitoring at least one of the first set of occasions and the second set of occasions may be via the second radio.

Some examples of the method, UEs, and non-transitory computer-readable medium described herein may further include operations, features, means, or instructions for receiving a WUS via the second radio and waking up the first radio in response to receiving the WUS via the second radio.

Some examples of the method, UEs, and non-transitory computer-readable medium described herein may further include operations, features, means, or instructions for receiving second control signaling activating the first DRX configuration and the second DRX configuration for the time period.

Some examples of the method, UEs, and non-transitory computer-readable medium described herein may further include operations, features, means, or instructions for receiving third control signaling deactivating the first DRX configuration, the second DRX configuration, or both for a second time period, the second time period after the time period.

In some examples of the method, UEs, and non-transitory computer-readable medium described herein, the first DRX configuration may be for first traffic associated with a first traffic pattern and one or more parameters for the first set of occasions may be based on the first traffic pattern and the second DRX configuration may be for second traffic associated with a second traffic pattern and one or more parameters for the second set of occasions may be based on the second traffic pattern, the second traffic pattern different than the first traffic pattern.

A method for wireless communications by a network entity is described. The method may include outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period, outputting, during the time period, a first WUS during a first WUS monitoring occasion included in the first set of WUS monitoring occasions, and outputting during the time period, a second WUS during a second WUS monitoring occasion included in the second set of WUS monitoring occasions.

A network entity for wireless communications is described. The network entity may include one or more memories storing processor executable code, and one or more processors coupled with the one or more memories. The one or more processors may individually or collectively be operable to execute the code to cause the network entity to output control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period, output, during the time period, a first WUS during a first WUS monitoring occasion included in the first set of WUS monitoring occasions, and output during the time period, a second WUS during a second WUS monitoring occasion included in the second set of WUS monitoring occasions.

Another network entity for wireless communications is described. The network entity may include means for outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period, means for outputting, during the time period, a first WUS during a first WUS monitoring occasion included in the first set of WUS monitoring occasions, and means for outputting during the time period, a second WUS during a second WUS monitoring occasion included in the second set of WUS monitoring occasions.

A non-transitory computer-readable medium storing code for wireless communications is described. The code may include instructions executable by one or more processors to output control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period, output, during the time period, a first WUS during a first WUS monitoring occasion included in the first set of WUS monitoring occasions, and output during the time period, a second WUS during a second WUS monitoring occasion included in the second set of WUS monitoring occasions.

In some examples of the method, network entities, and non-transitory computer-readable medium described herein, the first set of WUS monitoring occasions associated with the first DRX configuration may have a first periodicity and the second set of WUS monitoring occasions associated with the second DRX configuration may have a second periodicity, the second periodicity different than the first periodicity.

In some examples of the method, network entities, and non-transitory computer-readable medium described herein, a timeline for the first set of WUS monitoring occasions associated with the first DRX configuration may be based on a first timing offset relative to a reference time and a timeline for the second set of WUS monitoring occasions associated with the second DRX configuration may be based on a second timing offset relative to the reference time, the second timing offset different than the first timing offset.

In some examples of the method, network entities, and non-transitory computer-readable medium described herein, the first set of WUS monitoring occasions associated with the first DRX configuration may be associated with a first timer duration and the second set of WUS monitoring occasions associated with the second DRX configuration may be associated with a second timer duration, the second timer duration different than the first timer duration.

In some examples of the method, network entities, and non-transitory computer-readable medium described herein, the first timer duration and the second timer duration may be for a same type of timer, the type of timer including an inactivity timer, a monitoring duration timer, an active duration timer, an offset timer, or a retransmission timer.

In some examples of the method, network entities, and non-transitory computer-readable medium described herein, the first set of WUS monitoring occasions associated with the first DRX configuration each may have a first duration and the second set of WUS monitoring occasions associated with the second DRX configuration each may have a second duration, the second duration different than the first duration.

In some examples of the method, network entities, and non-transitory computer-readable medium described herein, the first set of WUS monitoring occasions associated with the first DRX configuration may be associated with a first WUS index and the second set of WUS monitoring occasions associated with the second DRX configuration may be associated with a second WUS index, the second WUS index different than the first WUS index.

In some examples of the method, network entities, and non-transitory computer-readable medium described herein, the first set of WUS monitoring occasions associated with the first DRX configuration may be associated with a first transmission configuration indication state and the second set of WUS monitoring occasions associated with the second DRX configuration may be associated with a second transmission configuration indication state, the second transmission configuration indication state different than the first transmission configuration indication state.

In some examples of the method, network entities, and non-transitory computer-readable medium described herein, the first set of WUS monitoring occasions associated with the first DRX configuration may be associated with a first WUS bandwidth and the second set of WUS monitoring occasions associated with the second DRX configuration may be associated with a second WUS bandwidth, the second WUS bandwidth different than the first WUS bandwidth.

In some examples of the method, network entities, and non-transitory computer-readable medium described herein, the first set of WUS monitoring occasions associated with the first DRX configuration may be associated with a first priority and the second set of WUS monitoring occasions associated with the second DRX configuration may be associated with a second priority, the second priority different than the first priority.

In some examples of the method, network entities, and non-transitory computer-readable medium described herein, the multiple DRX configurations further include a third DRX configuration associated with a third set of WUS monitoring occasions and the third DRX configuration may be also active during the time period.

In some examples of the method, network entities, and non-transitory computer-readable medium described herein, the first set of occasions and the second set of occasions may be associated with a same frequency range.

Some examples of the method, network entities, and non-transitory computer-readable medium described herein may further include operations, features, means, or instructions for outputting second control signaling activating the first DRX configuration and the second DRX configuration for the time period.

Some examples of the method, network entities, and non-transitory computer-readable medium described herein may further include operations, features, means, or instructions for outputting third control signaling deactivating the first DRX configuration, the second DRX configuration, or both for a second time period, the second time period after the time period.

In some examples of the method, network entities, and non-transitory computer-readable medium described herein, the first DRX configuration may be for first traffic associated with a first traffic pattern and one or more parameters for the first set of occasions may be based on the first traffic pattern and the second DRX configuration may be for second traffic associated with a second traffic pattern and one or more parameters for the second set of occasions may be based on the second traffic pattern, the second traffic pattern different than the first traffic pattern.

DETAILED DESCRIPTION

Figure 1:
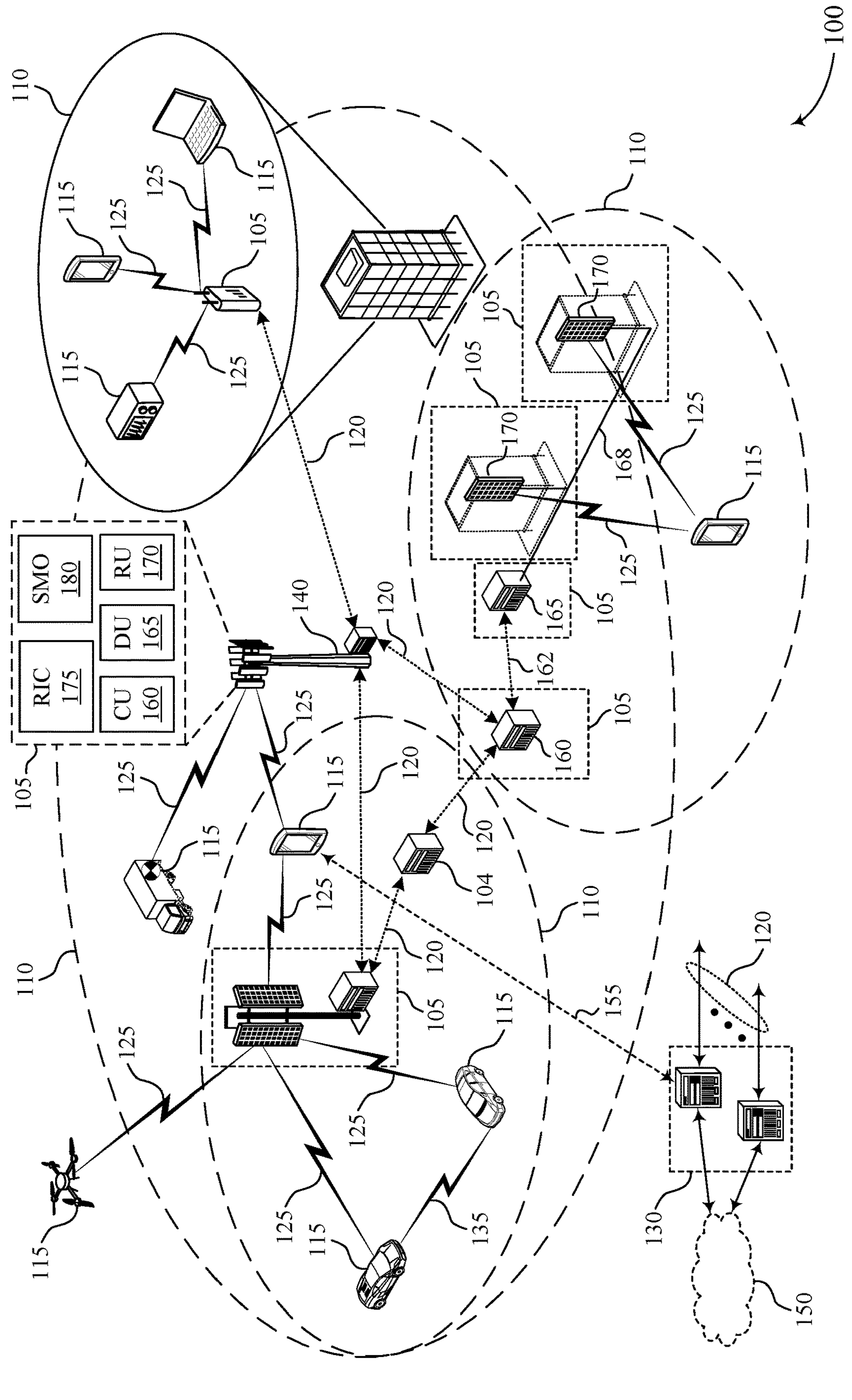
FIG. 1 shows an example of a wireless communications system that supports discontinuous reception (DRX) configurations for wake-up signal (WUS) monitoring in accordance with one or more aspects of the present disclosure.

In some wireless communications systems, a user equipment (UE) may monitor for wake-up signals (WUSs) from a network entity. In some examples, the UE may have a low-power receiver (LR) for receiving low-power WUSs (LP-WUSs). The LR may use less power than the main radio (MR), and receiving LP-WUSs may consume less power than WUSs. In some examples, the UE may monitor signals according to discontinuous reception modes (DRX), which may include idle discontinuous reception (iDRX) mode and connected mode discontinuous reception mode (CDRX). When operating in iDRX mode, the UE may periodically wake up to monitor for paging messages. In some examples, the UE may monitor for signals according to CDRX mode, where the UE may periodically wake up to monitor for WUSs, such as LP-WUSs. In some examples, when monitoring according to a DRX mode, the UE saves power but may have increased latency with respect to receiving signals.

Techniques described herein provide for a WUS monitoring scheme where the UE monitors multiple DRX configurations (e.g., multiple iDRX or multiple CDRX configurations, or any combination thereof) at a time, creating "floating" LP-WUS reception. Monitoring multiple DRX configurations may reduce latency of data reception, and monitoring for LP-WUSs periodically may reduce power consumption (e.g., the UE is configured with multiple DRX configurations, where two or more of the configured DRX configurations may be concurrently active). For example, monitoring LP-WUSs using the LR may enable the MR to remain in a sleep mode for a greater portion of a UE's operation, resulting in saved power for the UE. One or more parameters may differ between active DRX configurations for a UE, providing flexibility with respect to the timing and frequency with which the UE actively monitors for one or more WUSs. For example, different active DRX configurations for a UE may correspond to different respective traffic flows (e.g., information flows) for the UE, where the respective traffic flows are associated with different traffic patterns (e.g., timing and durations of messages) and the DRX configurations are configured to align the associated monitoring occasions with the respective traffic flows (e.g., so the UE can wake up with low latency for each traffic flow but without being awake more than necessary).

The UE may receive control signaling indicating multiple DRX configurations for monitoring LP-WUSs, and parameters associated with each DRX configuration. Parameters may include configuration parameters, such as periodicity, starting offsets, monitoring occasion durations, and timers, as well as signal parameters, such as indexes, transmission configuration index (TCI) states, and bandwidth. For example a first DRX configuration may have a different periodicity than a second DRX configuration, or may have a same periodicity with a starting offset. In some examples, monitoring occasions of different active DRX configurations may overlap, resulting a in a possible conflict. The UE may skip conflicting monitoring occasions based on priority, which may be indicated by the network entity. In some examples, the network entity may activate or deactivate the DRX configurations, or configure the UE to autonomously activate or deactivate the DRX configuration, such as after receiving a LP-WUS. Upon receiving a signal, the UE may wake-up the MR. In some examples, DRX configurations described herein may apply to one or both of iDRX or CDRX modes.

Aspects of the disclosure are initially described in the context of wireless communications systems. Aspects of the disclosure are further illustrated by and described with reference to DRX diagrams and a process flow diagram. Aspects of the disclosure are further illustrated by and described with reference to apparatus diagrams, system diagrams, and flowcharts that relate to DRX configurations for WUS monitoring.

FIG. 1 shows an example of a wireless communications system 100 that supports DRX configurations for WUS monitoring in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

In the case of the techniques described herein applied in the context of a disaggregated RAN architecture, one or more components of the disaggregated RAN architecture may be configured to support DRX configurations for WUS monitoring as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as “listening” according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein provide for multiple DRX configurations for WUS monitoring (e.g., multiple iDRX configurations, multiple CDRX configurations, or any combination thereof). The DRX configurations may be transmitted by the network entity 105, and may be received by the UE 115. The UE 115 may monitor for WUSs, such as LP-WUSs, according to the DRX configurations indicated by the network entity 105-*a*. The network entity may transmit further control signaling indicating parameters associated with each DRX configuration. Parameters may include configuration parameters, such as periodicity, starting offsets, monitoring occasion durations, and timers, as well as signal parameters, such as indexes, TCI states, and bandwidth. For example, a first DRX configuration may have a different periodicity than a second DRX configuration, or may have a same periodicity with a starting offset.

In some examples, monitoring occasions of different DRX configurations may overlap, resulting a in a possible conflict. The network entity 105 may indicate priority of each DRX configuration, indicate a default configuration, in the event of a conflict. For example, the UE 115 may receive an indication that the first DRX configuration is the default, or of highest priority, and skip any other monitoring occasions that occur at the same time. In some examples, the network entity 105 may activate or deactivate the DRX configurations, or configure the UE 115 to activate or deactivate DRX configurations, such as after receiving a LP-WUS. Upon receiving a WUS signal, the UE may wakeup the MR. Techniques and methods are further described herein the reference to FIGS. 2-7.

Figure 2:
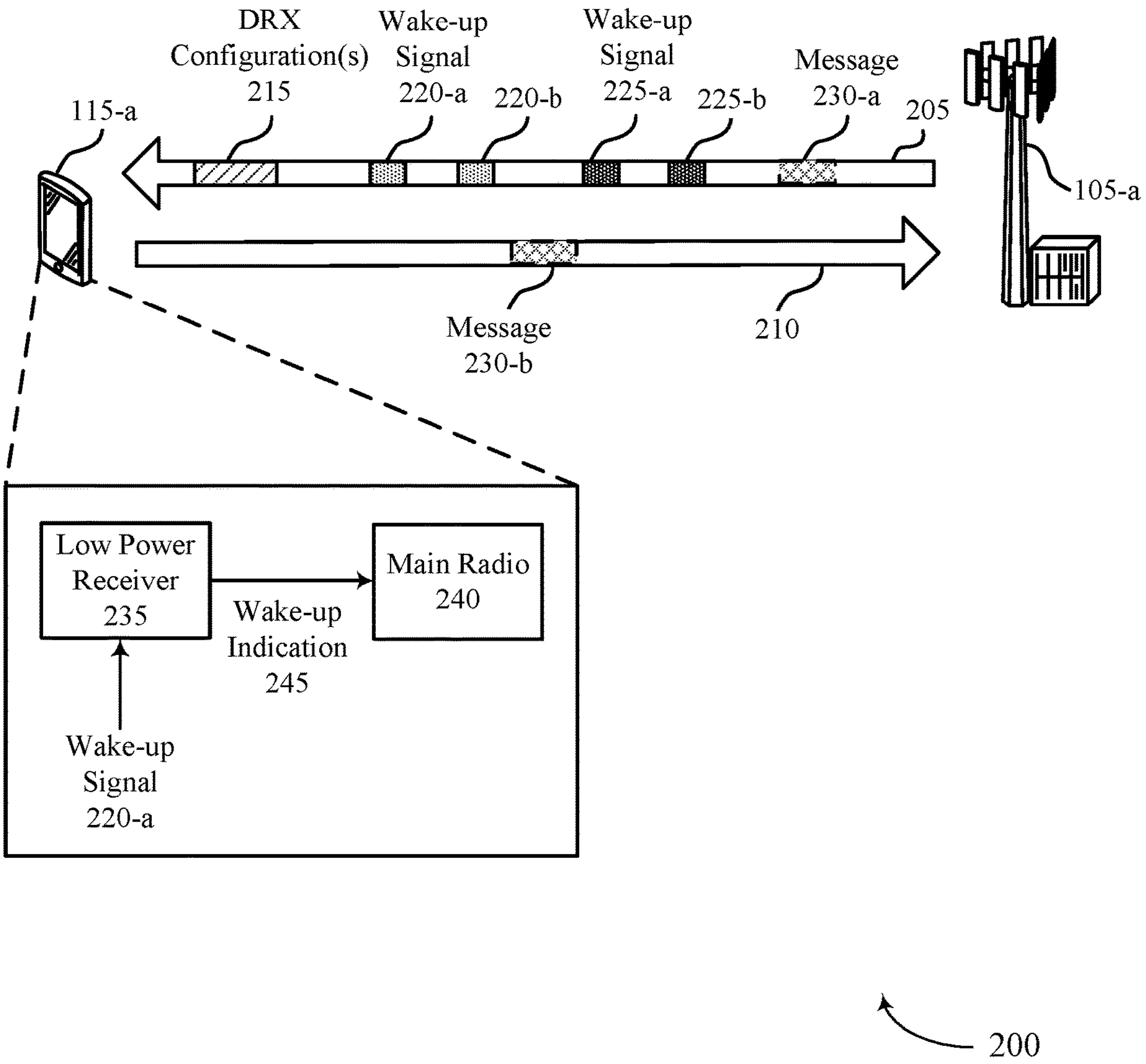
FIG. 2 shows an example of a wireless communications system that supports DRX configurations for WUS monitoring in accordance with one or more aspects of the present disclosure.

FIG. 2 shows an example of a wireless communications system 200 that supports DRX configurations for WUS monitoring in accordance with one or more aspects of the present disclosure. Specifically, the wireless communications system 200 illustrates one or more DRX configurations 215 transmitted from a network entity 105-*a* to a UE 115-*a*. The network entity 105-*a* may be an example of the network entity 105 as described with reference to FIG. 1, and the UE 115-*a* may be an example of the UE 115 as described with reference to FIG. 1. FIG. 2 may implement, or be implemented by, aspects of additional figures described herein. In some examples, the multiple DRX configurations may be multiple CDRX configurations, multiple iDRX configurations, or any combination thereof.

The network entity 105-*a* and the UE 115-*a* may communicate via a communication link 205 (e.g., a downlink channel, a physical downlink control channel (PDCCH), a physical downlink shared channel (PDSCH), among other examples) and a communication link 210 (e.g., an uplink channel, a physical uplink control channel (PUCCH), a physical uplink shared channel (PUSCH), among other examples). The network entity 105-*a* may transmit the DRX configurations 215 via the communication link 205. In some examples, the network entity 105-*a* may transmit one or more WUSs 220 (e.g., a WUS 220-*a* and a WUS 220-*b*) and one or more WUSs 225 (e.g., a WUS 225-*a* and a WUS 225-*b*). The network entity 105-*a* may transmit a message 230-*a* after transmitting the one or more WUSs 220, the one or more WUSs 225, or both. In some examples, the UE 115-*a* may transmit a response message 230-*b*.

In some examples, a UE 115-*a* may use a low power receiver (LR) 235 (e.g., low power wake-up radio (LP-WUR)) to monitor for a and receive low power WUSs (LP-WUSs). In some examples, the WUSs 220 and WUSs 225 may be LP-WUSs. The UE 115-*a* may monitor for signals, such as WUSs or LP-WUSs, in place of the MR 240. In some examples, the UE 115-*a* may receive a LP-WUS (e.g., the) via the LR 235, and wake up the MR 240. For example, the UE 115-*a* may receive the WUS 220-*a* via the LR 235. In some examples, the UE 115-*a* may receive the WUS 220-*b*, the WUS 225-*a*, the WUS 225-*b*, or another WUS via the LR 235. In some examples, the UE 115-*a* may transmit a wake-up indication 245 to indicate to the MR 240 radio to wake-up, or transmit another indication of the received LP-WUS. For example, the LR 235 may send a wake-up indication 245 to the MR 240; or the LR 235 may send a signal to a communications manager as described herein, and the communications manager may send a wake-up indication 245 to the MR 240 in response to receiving the signal from the LR 235. Such a method reduces power consumption, as the LR 235 operates at less power than the MR 240. After waking the MR 240, the MR 240 may monitor for a DCI, and the LR 235 may return to an idle mode.

In some examples, the UE 115-*a* may operate according to DRX, and may periodically enter a sleep state (e.g., idle mode, reduced power mode, etc.). The network entity 105-*a* may transmit a DRX configuration, which may indicate periodicities for monitoring occasions, where the UE 115-*a* may monitor for a LP-WUS signal at intervals and enter a sleep state between intervals. The UE 115-*a* may monitor at each interval for a period of time, or a monitoring duration. Such a method, combined with LP-WUSs, may result in power savings for both idle and connected modes, especially in applications with higher power consumption, such as frequency range 2 (FR2).

The UE 115-*a* may monitor for LP-WUSs via a LR 235 according to multiple DRX configurations 215 with different parameters for the same band (e.g., FR2), which may result in a maximization of power usage for monitoring. Monitoring multiple DRX configurations 215 may create a "floating" wake-up possibility, including continuous monitoring (e.g., fully floating monitoring windows) and duty-cycled monitoring (e.g., discretized floating by monitoring periodicities accordingly to LR 235 capability). The multiple DRX configurations 215 may be configured for each set of components carriers or frequency band. Staggering the monitoring occasions may reduce latency while reducing power consumption, as multiple DRX modes and occasions may be monitored without powering on the MR 240.

The multiple DRX configurations 215 may include multiple configurations with different parameters, such as DRX parameters and LP-WUS parameters. LP-WUS parameters may include a LP-WUS index, a LP-WUS TCI state for transmission or reception beams, and LP-WUS bandwidth. DRX parameters may include periodicity, offset, timers for the multiple DRX configurations, and monitoring occasions for LP-WUS(s) in each of those multiple DRX configurations. For example, a first DRX configuration may have a periodicity of monitoring occasions every 80 milliseconds (ms), and a second DRX configuration may have a periodicity of 60 ms, where monitoring begins at the same time. The UE 115-*a* may monitor for both DRX configurations simultaneously, monitoring for the second DRX configuration at 60 ms, the first DRX configuration at 80 ms, the second at 120 ms, the first at 160 ms, etc.

DRX timers may include inactivity timers (e.g., drx-inactivity-timer), monitoring duration timers, active duration timers (e.g., drx-on-duration-timer), offset timers, uplink hybrid automatic repeat request (HARQ) timers (e.g., drx-HARQ-RTT-timer-UL), downlink HARQ timers (e.g., HARQ-RTT-timer-DL), uplink retransmission timers (e.g., drx-retransmission-timer-UL), downlink retransmission timers (e.g., drx-retransmission timer-DL), or a combination thereof. In some examples, the DRX configurations may have multiple timers of the same types, and for a given type of timer, the timer duration for that type of timer might be different across at least some of the multiple DRX configurations.

In some examples, the network entity 105-*a* may transmit multiple WUSs in accordance with the multiple DRX configurations 215. For example, the network entity 105-*a* may transmit the WUS 220-*a* in accordance with the first DRX configuration, and the WUS 225-*a* in accordance with the second DRX configuration. In some examples, the network entity 150-*a* may transmit multiple WUSs for each configuration, such as transmitting a second WUS 220-*b* corresponding to the first configuration and the WUS 225-*b* corresponding to the second configuration.

Figure 3:
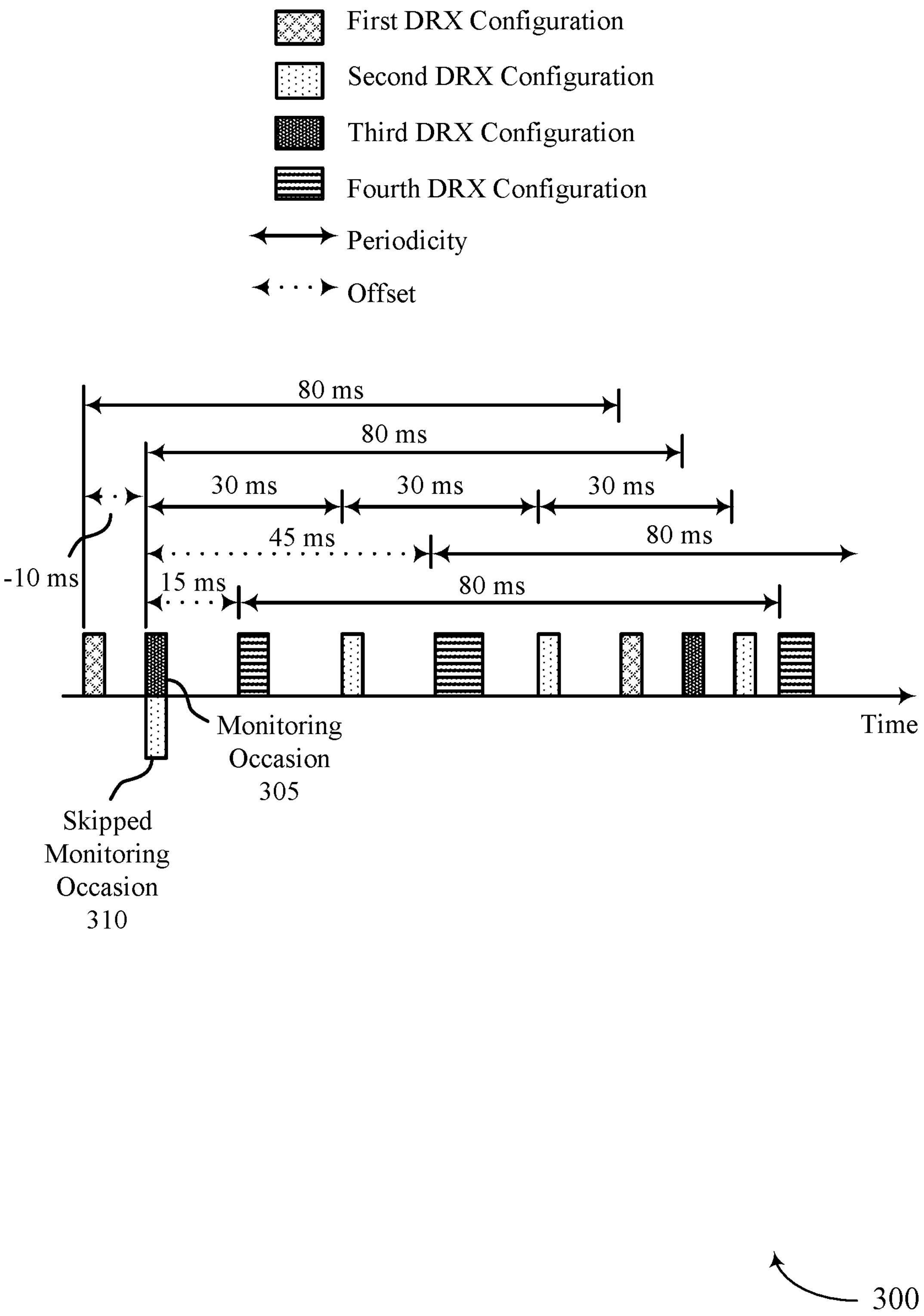
FIG. 3 shows an example of a DRX diagram that supports DRX configurations for WUS monitoring in accordance with one or more aspects of the present disclosure.

FIG. 3 shows an example of a DRX diagram 300 that supports DRX configurations for WUS monitoring in accordance with one or more aspects of the present disclosure. Specifically, the DRX diagram 300 may describe multiple DRX configurations (e.g., the DRX configurations 215 as describe with reference to FIG. 2) and each configuration's monitoring occasions. The monitoring occasions may be monitored by a UE, such as the UE 115 as described with reference to FIG. 1. FIG. 2 may implement, or be implemented by, aspects of additional figures described herein. In some examples, the multiple DRX configurations may be multiple CDRX configurations, multiple iDRX configurations, or any combination thereof.

The UE may receive multiple DRX configurations, such as a first DRX configuration, a second DRX configuration, a third DRX configuration, and a fourth DRX configuration. Each DRX configuration may have a set of parameters. In some examples, the DRX configurations may configure the UE to always monitor for LP-WUS using the LR when the MR is in an idle or sleep mode. In some examples, each DRX configuration may have different periodicities, start offsets, timers, beams, etc. The offset may be in reference to another DRX configuration, a period time, or another time point, such as a slot.

The network entity may configure each parameter to the traffic arrival pattern at the network entity of UE, which may further reduce latency.

For example, the first DRX configuration may have a periodicity of 80 ms (e.g., an 80 ms DRX cycle, or 80 ms between monitoring occasions), a monitoring duration of one slot (e.g., 1 ms), and an offset of −10 ms (e.g., or 70 ms). That is, the first DRX configuration may be configured with −10 ms offset from the third DRX configuration, or starting 10 ms prior to the third DRX configuration.

The second DRX configuration may have a periodicity of 30 ms and monitoring durations of 1 ms. The third DRX configuration may have a periodicity of 80 ms, and a monitoring duration of 1 ms. The fourth DRX configuration may have a periodicity of 80 ms, an offset of 15 ms and a monitoring duration of 2 ms, and an offset of 45 ms and a monitoring durations of 5 ms. That is, there may be a monitoring occasion 15 ms after the monitoring occasion 305 with a duration of 2 ms, and then monitoring occasions with durations of 2 ms every 80 ms. In addition, there may be a monitoring occasion 45 ms after the monitoring occasion 305 with a duration of 5 ms, and a monitoring occasion with a duration of 5 ms after 80 ms after that.

In some examples, DRX configuration monitoring occasions may overlap. For example, the monitoring occasion 305, or the first monitoring occasion of the third DRX configuration, may overlap the skipped monitoring occasion 310, or the first monitoring occasion of the second DRX configuration. In such examples, UE may decide the parameters of LP-WUS monitoring (for e.g., sequence index, bandwidth, beam etc.) for the overlapped monitoring occasions according to one of the DRX configurations involved in the overlap. Which DRX configuration to use for monitoring and which DRX configuration(s) to skip monitoring during the overlapped monitoring occasions, may be determined according to priority, preconfigured, or otherwise determined by the UE. In some examples, such as for longer monitoring duration, periodicity may be counted from the end of the monitoring duration, instead of the beginning.

Figure 4:
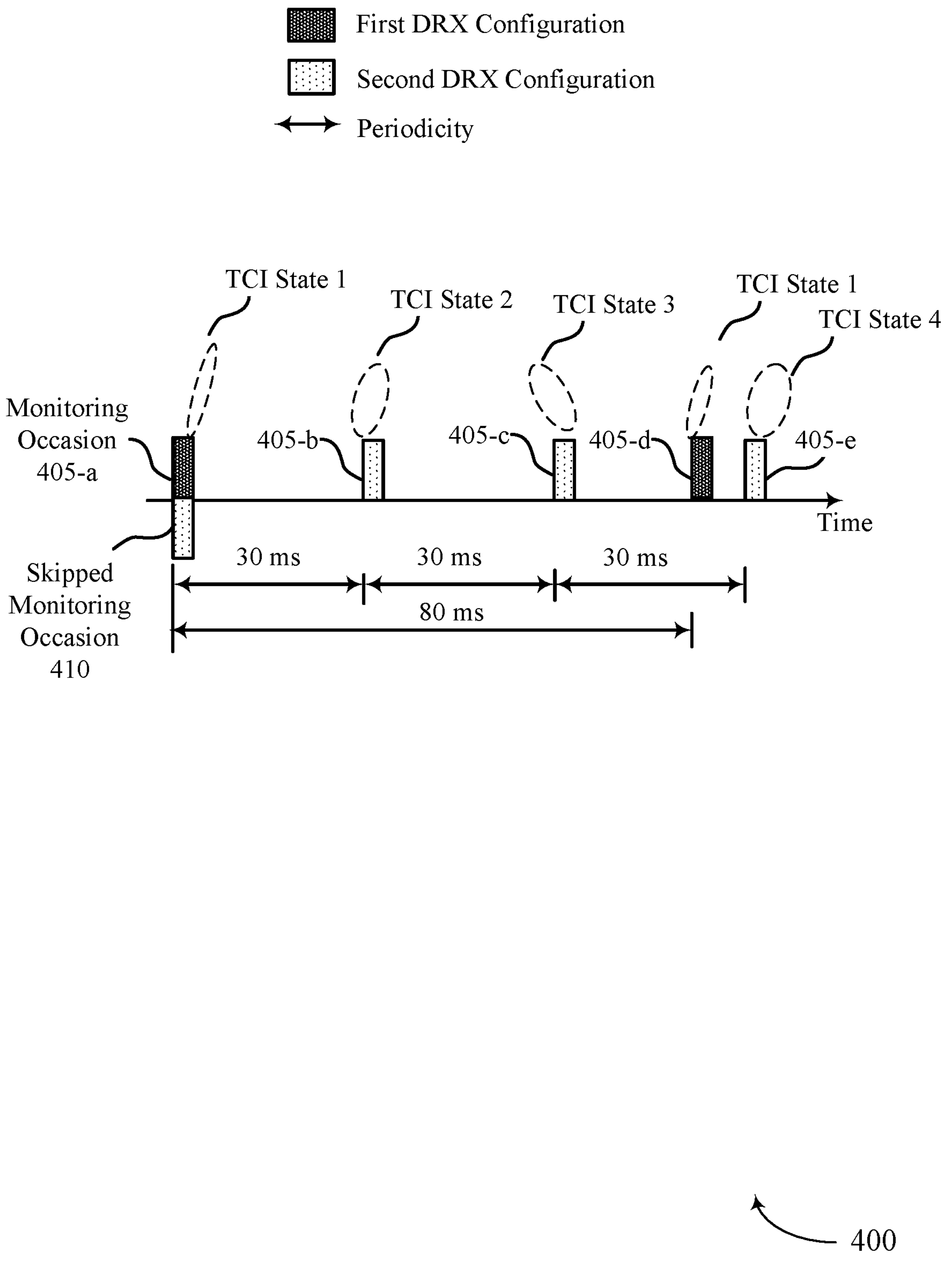
FIG. 4 shows an example of a DRX diagram that supports DRX configurations for WUS monitoring in accordance with one or more aspects of the present disclosure.

FIG. 4 shows an example of a DRX diagram 400 that supports DRX configurations for WUS monitoring in accordance with one or more aspects of the present disclosure. For example, the DRX diagram 400 illustrates a first DRX configuration and a second DRX configuration with different parameters for monitoring for monitoring occasions 405. The parameters may include DRX parameters and LP-WUS parameters. The LP-WUS parameters may include LP-WUS indices, LP-WUS transmission configuration indicator (TCI) states, and LP-WUS bandwidth. FIG. 4 may implement, or be implemented by, aspects of additional figures described herein. In some examples, the multiple DRX configurations may be multiple CDRX configurations, multiple iDRX configurations, or any combination thereof.

The first DRX configuration may have a periodicity of 80 ms, and the second DRX configuration may have a periodicity of 30 ms. The monitoring occasion 405-*a* may occur at the same time as a skipped monitoring occasion 410.

For each DRX configuration, the UE may monitor for the LP-WUS parameters. For example, the LP-WUS index may be the same, or different, for different DRX configurations. For example, the first DRX configuration may have an index of 1, and the DRX configuration may have an index of 2. In some examples, the index may be associated with the UE group ID. Further, the index may change over time for the same DRX configuration. For example, the UE group ID, and thus the monitored LP-WUSindex, may change across different LP-WUS monitoring occasions of a DRX configuration.

Each WUS may have a TCI state for either the transmission or reception beam. The TCI state for LP-WUS monitoring may be the same or different, for different DRX configurations. In some examples, the TCI state may be the same or different for different monitoring occasions of a DRX configuration. For example, a monitoring occasion 405-*a* and a monitoring occasion 405-*d* may have the TCI state 1, while a monitoring occasion 405-*b* may have a TCI state 2, a monitoring occasion 405-*c* may have a TCI state 3, and a monitoring occasion 405-*e* may have a TCI state 4.

Different TCI states may allow for beam sweep and increase the probability of wake-up. A sharper beam may be used for high priority data, and a wider beam (e.g., switching off the antenna) may be used for low priority data. A sharper or narrower beam may provide more signal energy, but may increase the energy cost of more active antenna elements and result in higher power consumption. For example, the TCI state 1 may be a narrower beam used on monitoring occasions 405-*a*, 405-*d* spaced 80 ms apart whereas the TCI state 2, TCI state 3, and TCI state 4, may be wider beams used on monitoring occasions 405-*b*, 405-*c*, 405-*e* spaced 30 ms apart. The network entity may receive an ACK/NACK for the UE after the UE wakes up, according to the LP-WUS, which indicates to the network entity which beam was detected by the UE. If the UE is not in the coverage of the LP-WUS, the network entity may send a WUS on a different beam or switch to a different LP-WUS index.

The DRX configurations may have different bandwidths associated with LP-WUSs. Higher bandwidth may be allocated with larger periodicity to ensure more reliable wake-up, but result in higher power consumption. A UE may be more frequently configured for smaller bandwidth monitoring, which may save UE power. A UE monitoring LP-WUS with different bandwidths across different DRX configurations may also enable the network to sweep across different levels of cell coverage and increase reliability of communication. For example, a narrower beam, such as the beams of the monitoring occasion 405-*a* and the monitoring occasions 405-*d*, may provide for more coverage. Wider beams, such as the beams of the monitoring occasion 405-*b*, monitoring occasion 405-*c*, monitoring occasion 405-*e*, may have smaller coverage. A UE near the center of the cell may detect LP-WUS with a smaller bandwidth (and smaller coverage) whereas a UE at the cell edge may only detect LP-WUS with a larger bandwidth (and larger coverage). Thus, by keeping the periodicity of the second DRX configuration associated with a smaller bandwidth of LP-WUS monitoring, as more frequent, compared to the first DRX configuration associated with a larger bandwidth of LP-WUS monitoring, may save UE power for UEs which are near the cell center. For example, the first DRX configuration monitoring occasions 405 may have a bandwidth of 80 MHz, and the second DRX configuration monitoring occasions 405 may have a bandwidth of 20 MHz.

Figure 5:
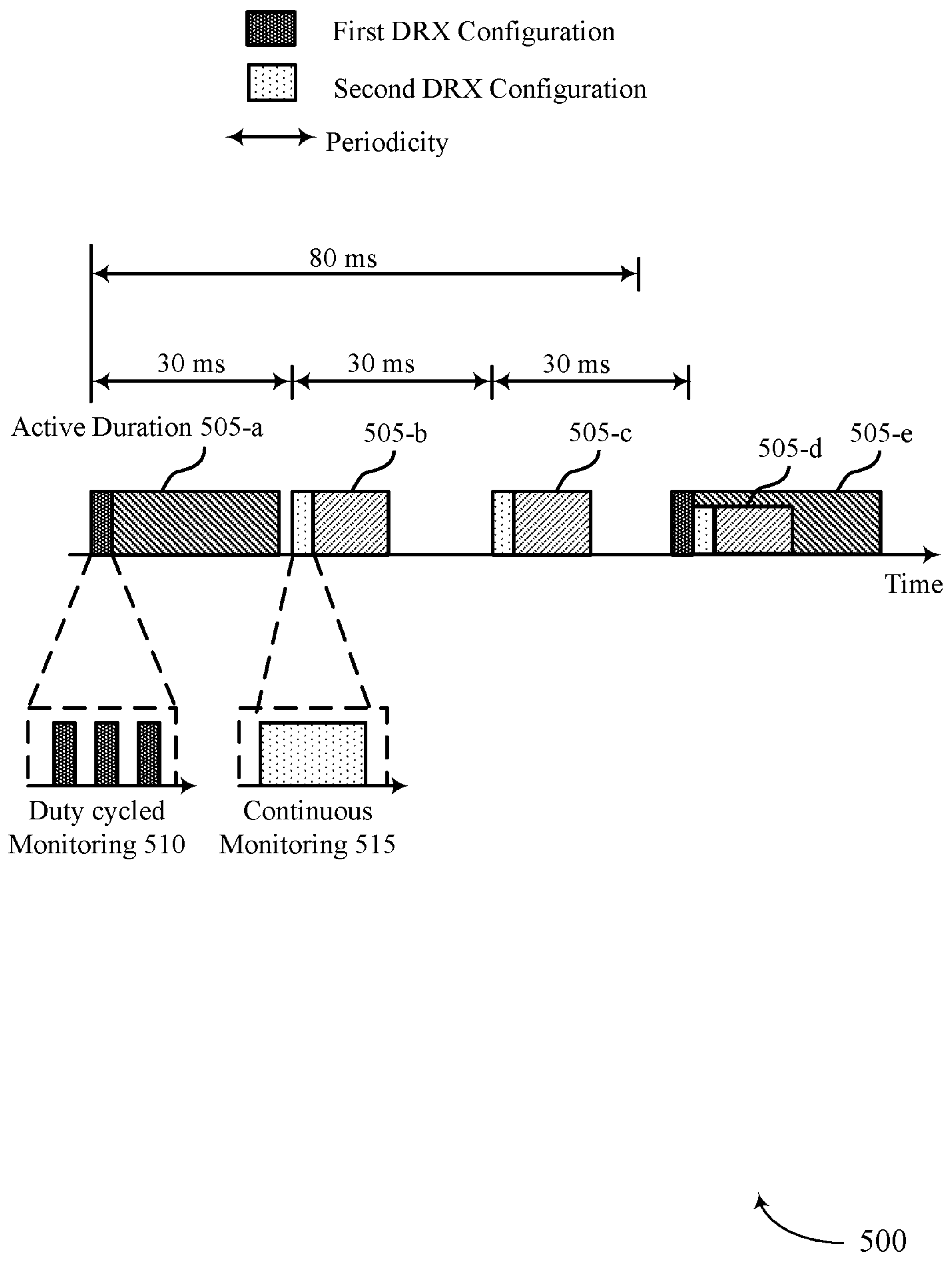
FIG. 5 shows an example of a DRX diagram that supports DRX configurations for WUS monitoring in accordance with one or more aspects of the present disclosure.

FIG. 5 shows an example of a DRX diagram 500 that supports DRX configurations for WUS monitoring in accordance with one or more aspects of the present disclosure. Specifically, the DRX diagram 500 describes the first DRX configuration and the second DRX configuration, which may have varying active durations and periodicities. FIG. 5 may implement, or be implemented by, aspects of additional figures described herein. In some examples, the multiple DRX configurations may be multiple CDRX configurations, multiple iDRX configurations, or any combination thereof.

The network entity may configure multiple DRX configurations with multiple periodicities and offsets to match traffic patterns, or the traffic arrival. For example, the first DRX configuration may have a periodicity of 30 ms, and may correspond to traffic with approximately 30 fps arrivals, or one hundred frames per three second period. The second DRX configuration may correspond to approximately 80 ms arrival periods, with a periodicity of 80 ms.

The DRX configurations may include timers, such as ON duration timers, retransmission, timers, and inactivity timers. For example, traffic of 30 fps arrivals may have smaller amounts of data, and may be received by monitoring fewer slots of ON duration, but traffic arriving every 80 ms may be larger and be received by monitoring multiple slots over a longer ON duration.

The network entity may activate and deactivate DRX configurations. In some examples, there may be a set of configured DRX configurations, and a subset may be active. The UE may monitor the activated DRX configurations. The network entity may activate or deactivate DRX configurations by adding bits to the LP-WUS when transmitting to the LR, or may transmit a DCI or MAC-CE when the MR is activated.

In addition, DRX configurations may each have respective active durations 505. The active durations 505 may be the combination of the time on ($T_{on}$) and the time inactive ($I_{nactivity}$). For example, the first DRX configuration may be configured with an active duration 505-*a*, which may repeat at each periodicity. For example, the active duration 505-*a* may repeat at an active duration 505-*e*. The active duration 505-*a* and the active duration 505-*e* may be the same length. An active duration 505-*b*, active duration 505-*c*, and active duration 505-*d* may be configured for the second DRX configuration. The active durations 505 associated with the second DRX configuration may be shorter than the active durations 505 associated with the first DRX configuration. In some examples, active durations 505 may overlap, such as the active duration 505-*d* and the active duration 505-*e*. Either active duration 505 may be used to wake-up the MR of the UE depending on which LP-WUS monitoring occasion and the associated DRX configuration (e.g., the LP-WUS corresponding to the first DRX configuration or the LP-WUS corresponding to the second DRX configuration) was transmitted by the network to wake-up the UE. In some examples, if the UE is woken up by an LP-WUS to monitor the active duration 505-*e* according to the first DRX configuration, then the network may not send another LP-WUS to wake-up the UE to monitor the overlapping active duration 505-*d* according to the second DRX configuration, as the UE is already in an active state.

A common timing reference may be configured for the DRX configurations. For example, an aligned start time may be defined for DRX configurations with different periodicities. The aligned start time may be when the UE switches into DRX mode from another mode (such as a connected mode), or set to a periodic reference time. For example, all the DRX configurations may restart every 10 seconds.

The network entity may configure starts and stops of DRX configuration monitoring, such as by configuring automatic, or autonomous monitoring starting and stopping by the UE. For example, the network entity may configure the UE to gradually stop monitoring one or more of the DRX configurations if no wake-up command is received. For example, the UE may stop monitoring one DRX configuration at a time if no wake-up signal is received on that DRX configuration for a certain time. Similarly, the UE may gradually, such as one by one, start monitoring DRX configurations when LP-WUSs are received.

Multiple DRX configurations configured to start and stop may be similar to short DRX cycles, and may increase flexibility and reduce latency. Additionally, using the LP-WUSs to start and stop DRX configurations may result in reduced power consumption.

The UE may skip monitoring LP-WUSs that overlap with the active time of the MR. For example, the network entity may not send a LP-WUS in addition to transmitting a grant via DCI to the MR. IN some examples, the network entity may indicate a few bits of information by choosing which LP-WUS to wake-up the UE among a set of LP-WUSs in a time-period. For example, within a configured set of LP-WUSs, the signal may convey $\log_2(M)$ bits, where M is the number of configured LP-WUSs where the UE receives (e.g., equally expects to find) a LP-WUS. The configured LP-WUSs may belong to the same DRX configuration (e.g., with the same periodicity, offset, etc.) or to different DRX configurations (e.g., with different periodicity, offset, etc.).

In some examples, the monitoring occasions may be single occasions monitoring or window-based monitoring. Single occasions LP-WUS monitoring may be associated with a certain periodicity. In some examples, single occasions may instead be windows, or occasions associated with additional occasions. The windows may be either continuous monitoring 515 or duty cycled monitoring 510. The UE may monitor with the window and not monitor outside the window. For example, the first DRX configuration may be configured with duty cycled monitoring 510, where each monitoring occasion has discontinuous monitoring occasions. The second DRX configuration may be configured with continuous monitoring 515, where each occasion is monitored continuously.

Figure 6:
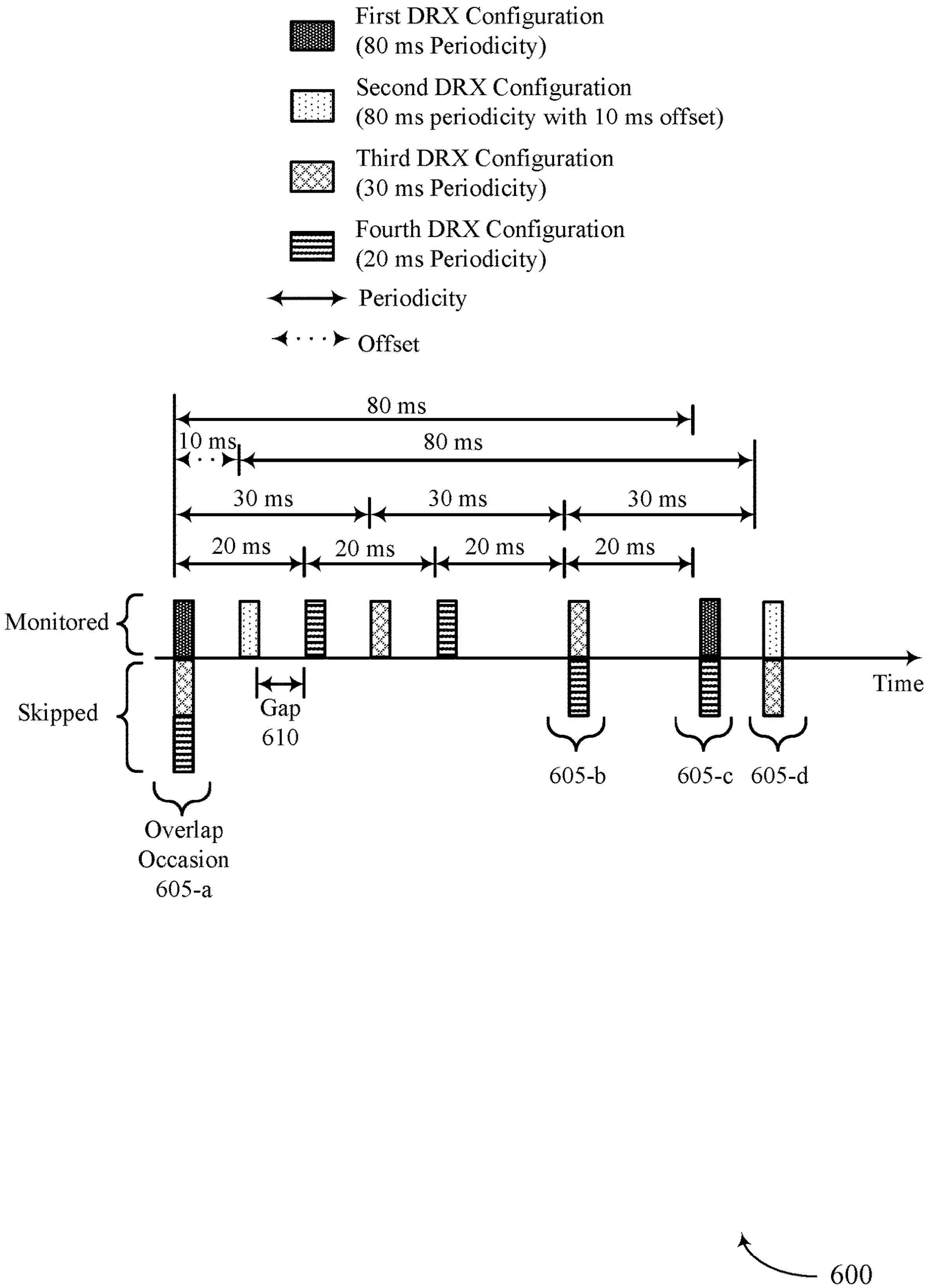
FIG. 6 shows an example of a DRX diagram that supports DRX configurations for WUS monitoring in accordance with one or more aspects of the present disclosure.

FIG. 6 shows an example of a DRX diagram 600 that supports DRX configurations for WUS monitoring in accordance with one or more aspects of the present disclosure. The DRX diagram 600 further describes multiple DRX configurations with overlapping occasions 605 (e.g., overlapping monitoring occasions), which may be addressed according to a specified order or priority. FIG. 5 may be implemented, or be implemented by, aspects of additional figures described herein. In some examples, the multiple DRX configurations may be multiple CDRX configurations, multiple iDRX configurations, or any combination thereof.

The first DRX configuration may have a periodicity of 80 seconds, the second DRX configuration may have a periodicity of 80 ms with an offset of 10 ms (e.g., starting time 10 ms after the first DRX configuration), the third DRX configuration may have a periodicity of 30 ms, and the fourth DRX configuration may have a periodicity of 20 ms. Various rules, conditions, or configurations may determine which monitoring occasions is monitored during overlap.

For example, the first DRX configuration may be set as a default configuration. The default configuration may have the highest priority and be set as a default, or fallback, monitoring occasion. For example, at an overlap occasion 605-*a*, monitoring occasions for the first, third, and fourth DRX configurations overlap. The first DRX configuration, being the default and highest priority, may be monitored, while the third and fourth DRX configurations may be skipped. At the overlap occasion 605-*a*, only LP-WUSs of the first DRX configuration may be received.

In some examples, the network entity may assign priority to each DRX configuration. For example, the second DRX configuration may have the second highest priority, the third DRX configuration may have the third highest priority, and the fourth DRX configuration may have the fourth highest priority. For example, at an overlap occasion 605-*b*, a monitoring occasion for the third DRX configuration and the fourth DRX configuration may overlap. In such an example, the third DRX configuration has higher priority than the fourth DRX configuration, and so the monitoring occasion of the third DRX configuration may be monitored and the monitoring occasion of the fourth DRX configuration may be skipped.

In another example, at an overlap occasion 605-*c*, the default, or highest priority occasion is the occasion of the first DRX configuration. The monitoring occasion of the fourth DRX configuration may be skipped. At an overlap occasion 605-*d*, the second DRX configuration may have higher priority than the third DRX configuration, and so UE may monitor for the second DRX configuration and skip the other.

In some examples, the DRX configurations may be closely configured in time. Closely configured monitoring occasions, which may be combined with beam or bandwidth sweeping, may increase reliability and decrease latency. For example, multiple occasions of different DRX configurations may be close in time, such as the first five occasions of FIG. 6, which have a gap 610 of 10 ms.

In some examples, the different LP-WUSs corresponding to the DRX configurations may have different bandwidths or be transmitted on different beams, which may increase coverage of possible WUSs. For example, the first DRX configuration may have a beamwidth of 20 MHz, the second DRX configuration may have a beamwidth of 40 MHz, the third DRX configuration may have a beamwidth of 80 MHz, and the fourth DRX configuration may have a beamwidth of 160 Mhz. Thus, in the first 40 ms of the first four monitoring occasions, the UE may monitor bandwidths from 20-160 MHz. Increasing bandwidth may result in increasing reliability of LP-WUS detection or to more information transmitted.

In some examples, a minimum staggering gap, such as a gap 610, may be configured between starting positions of the DRX configurations. The initial gap 610 between each first monitoring occasion of each DRX configuration may be configured to allow for the UE to send a response to the network entity if a LP-WUS is received. For example, the gap 610 may be 2 slots, or enough time for the UE to send an ACK after receiving a LP-WUS. The network entity may receive the response, and may refrain from transmitting another LP-WUS.

Figure 7:
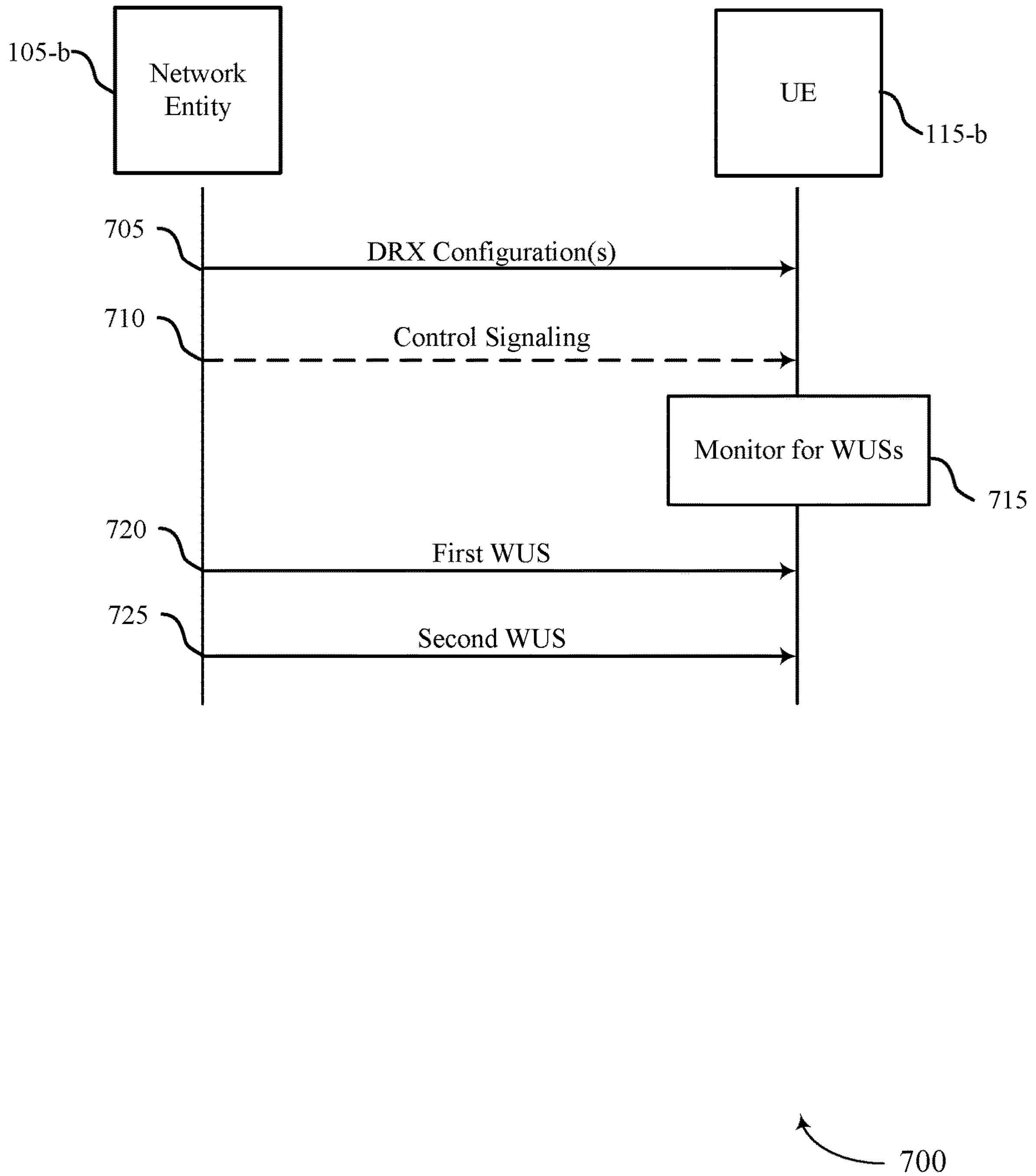
FIG. 7 shows an example of a process flow diagram that supports DRX configurations for WUS monitoring in accordance with one or more aspects of the present disclosure.

FIG. 7 shows an example of a process flow diagram 700 that supports DRX configurations for WUS monitoring in accordance with one or more aspects of the present disclosure. Specifically, the process flow diagram 700 illustrates DRX configuration communication and WUS monitoring between a network entity 105-*b* and a UE 115-*b*. The network entity 105-*b* may be an example of the network entity 105 as described with reference to FIG. 1, and the UE 115-*b* may be an example of the UE 115 as described with reference to FIG. 1. The process flow diagram 700 may implement, or be implemented by, aspects of additional figures described herein. In the following description of the process flow diagram 700, the operations between the UE 115-*b* and the network entity 105-*b* may be performed in different orders or at different times. Some operations may also be left out of the process flow diagram 700, or other operations may be added. Although the UE 115-*b* and the network entity 105-*b* are shown performing the operations of the process flow diagram 700, some aspects of some operations may also be performed by one or more other wireless devices. In some examples, the multiple DRX configurations may be multiple CDRX configurations, multiple iDRX configurations, or any combination thereof.

At 705, the UE 115-*b* may receive control signaling that indicates multiple DRX configurations for the UE 115-*b*, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period. In some examples, the WUSs may be LP-WUSs.

The first set of WUS monitoring occasions associated with the first DRX configuration may have a first periodicity and the second set of WUS monitoring occasions associated with the second DRX configuration may have a second periodicity, where the second periodicity is different than the first periodicity.

In some examples, the multiple DRX configurations may further include a third DRX configuration associated with a third set of WUS monitoring occasions, where the third DRX configuration is also active during the time period.

A timeline for the first set of WUS monitoring occasions associated with the first DRX configuration may be based on a first timing offset relative to a reference time and a timeline for the second set of WUS monitoring occasions associated with the second DRX configuration may be based on a second timing offset relative to the reference time, where the second timing offset is different than the first timing offset.

The first set of WUS monitoring occasions associated with the first DRX configuration may be associated with a first timer duration and the second set of WUS monitoring occasions associated with the second DRX configuration may be associated with a second timer duration, where the second timer duration is different than the first timer duration. The first timer duration and the second timer duration may be for a same type of timer, the type of timer including an inactivity timer, a monitoring duration timer, an active duration timer, an offset timer, an uplink hybrid automatic repeat request timer, a downlink hybrid automatic repeat request timer, an uplink retransmission timer, or a downlink retransmission timer.

In some examples, the first set of WUS monitoring occasions may each have a first duration and the second set of WUS monitoring occasions may each have a second duration, where the second duration is different than the first duration.

In some examples, the first set of WUS monitoring occasions may be associated with a first WUS index, a first TCI state, a first WUS bandwidth, or a combination thereof. The second set of WUS monitoring occasions may be associated with a second WUS index, a second TCI state, a second WUS bandwidth, or a combination thereof. In some examples, the second WUS index may be different than the first WUS index, the second TCI state may be different than the first TCI state, and the second WUS bandwidth may be different than the first WUS bandwidth.

The first set of WUS monitoring occasions and the second set of WUS monitoring occasions may be associated with a same frequency range.

The first DRX configuration may be for first traffic associated with a first traffic pattern and one or more parameters for the first set of occasions may be based on the first traffic pattern. The second DRX configuration may be for second traffic associated with a second traffic pattern and one or more parameters for the second set of occasions may be based at least in part on the second traffic pattern, where the second traffic pattern is different than the first traffic pattern.

At 710, the UE 115-*b* may receive control signaling. For example, the UE 115-*b* may receive second control signaling activating the first DRX configuration and the second DRX configuration for the time period. The UE 115-*b* may receive third control signaling deactivating the first DRX configuration, the second DRX configuration, or both for a second time period, the second time period being after the time period.

At 715, the UE 115-*b* may monitor, during the time period, the first set of WUS monitoring occasions in accordance with the first DRX configuration and monitor the second set of WUS monitoring occasions in accordance with the second DRX configuration.

The UE 115-*b* may monitor for a WUS monitoring occasion within the first set of WUS monitoring occasions or the second set of WUS monitoring occasions. Monitoring the WUS monitoring occasion may include monitoring portions of the WUS monitoring occasion in accordance with a duty cycle or include monitoring an entirety of the WUS monitoring occasion.

In some examples, monitoring the first set of WUS monitoring occasions may include monitoring for one or more first WUSs corresponding to the first WUS index, and monitoring the second set of WUS monitoring occasions may include monitoring for one or more second WUSs corresponding to the second WUS index.

The UE 115-*b* may identify that a first WUS monitoring occasion included in the first set of WUS monitoring occasions associated with the first DRX configuration overlaps in time with a second WUS monitoring occasion included in the second set of WUS monitoring occasions associated with the second DRX configuration. The UE 115-*b* may monitor the first WUS monitoring occasion, while refraining from monitoring the second WUS monitoring occasion, based a priority of the first WUS monitoring occasion being higher than a priority of the second WUS monitoring occasion.

The UE 115-*b* may include a first radio (e.g., the MR) and a second radio (e.g., the LR) associated with lower active power consumption than the first radio, and where monitoring at least one of the first set of WUS monitoring occasions and the second set of WUS monitoring occasions is via the second radio. The UE 115-*b* may receive a WUS via the second radio, and wake up the first radio in response to receiving the WUS via the second radio.

At 720, the network entity 105-*b* may output, during the time period, a first WUS during a first WUS monitoring occasion included in the first set of WUS monitoring occasions.

At 725, the network entity 105-*b* may output, during the time period, a second WUS during a second WUS monitoring occasion included in the second set of WUS monitoring occasions.

Figure 8:
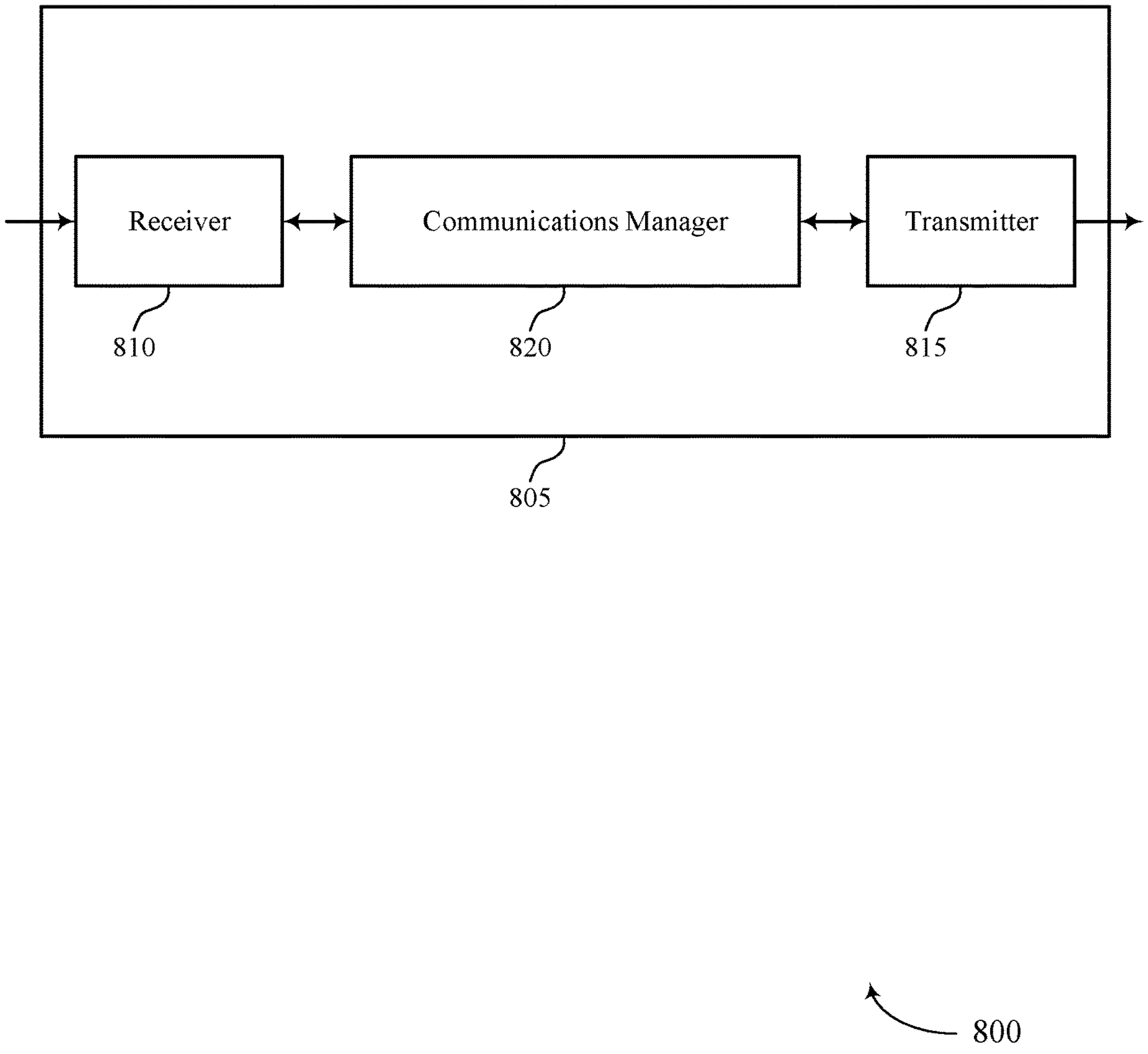
FIGS. 8 and 9 show block diagrams of devices that support DRX configurations for WUS monitoring in accordance with one or more aspects of the present disclosure.

FIG. 8 shows a block diagram 800 of a device 805 that supports DRX configurations for WUS monitoring in accordance with one or more aspects of the present disclosure. In some examples, the multiple DRX configurations may be multiple CDRX configurations, multiple iDRX configurations, or any combination thereof. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to DRX configurations for WUS monitoring). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DRX configurations for WUS monitoring). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of DRX configurations for WUS monitoring as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period. The communications manager 820 is capable of, configured to, or operable to support a means for monitoring, during the time period, the first set of WUS monitoring occasions in accordance with the first DRX configuration. The communications manager 820 is capable of, configured to, or operable to support a means for monitoring, during the time period, the second set of WUS monitoring occasions in accordance with the second DRX configuration.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for multiple DRX configurations for WUS monitoring, which may result in various advantages, such as reduced processing, reduced power consumption, and more efficient utilization of communication resources.

Figure 9:
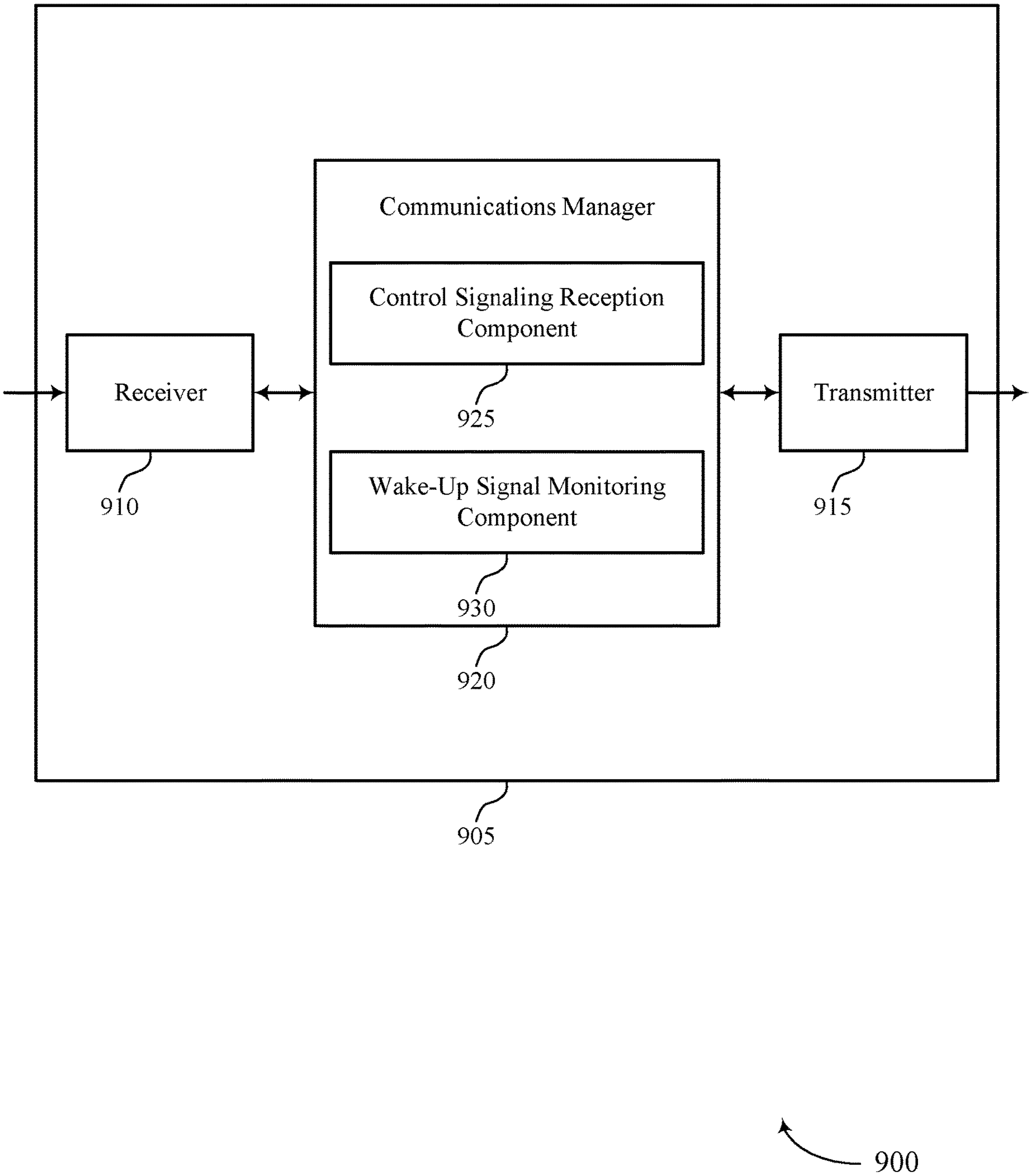

FIG. 9 shows a block diagram 900 of a device 905 that supports DRX configurations for WUS monitoring in accordance with one or more aspects of the present disclosure. In some examples, the multiple DRX configurations may be multiple CDRX configurations, multiple iDRX configurations, or any combination thereof. The device 905 may be an example of aspects of a device 805 or a UE 115 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to DRX configurations for WUS monitoring). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to DRX configurations for WUS monitoring). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of DRX configurations for WUS monitoring as described herein. For example, the communications manager 920 may include a control signaling reception component 925 a WUS monitoring component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The control signaling reception component 925 is capable of, configured to, or operable to support a means for receiving control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period. The WUS monitoring component 930 is capable of, configured to, or operable to support a means for monitoring, during the time period, the first set of WUS monitoring occasions in accordance with the first DRX configuration. The WUS monitoring component 930 is capable of, configured to, or operable to support a means for monitoring, during the time period, the second set of WUS monitoring occasions in accordance with the second DRX configuration.

Figure 10:
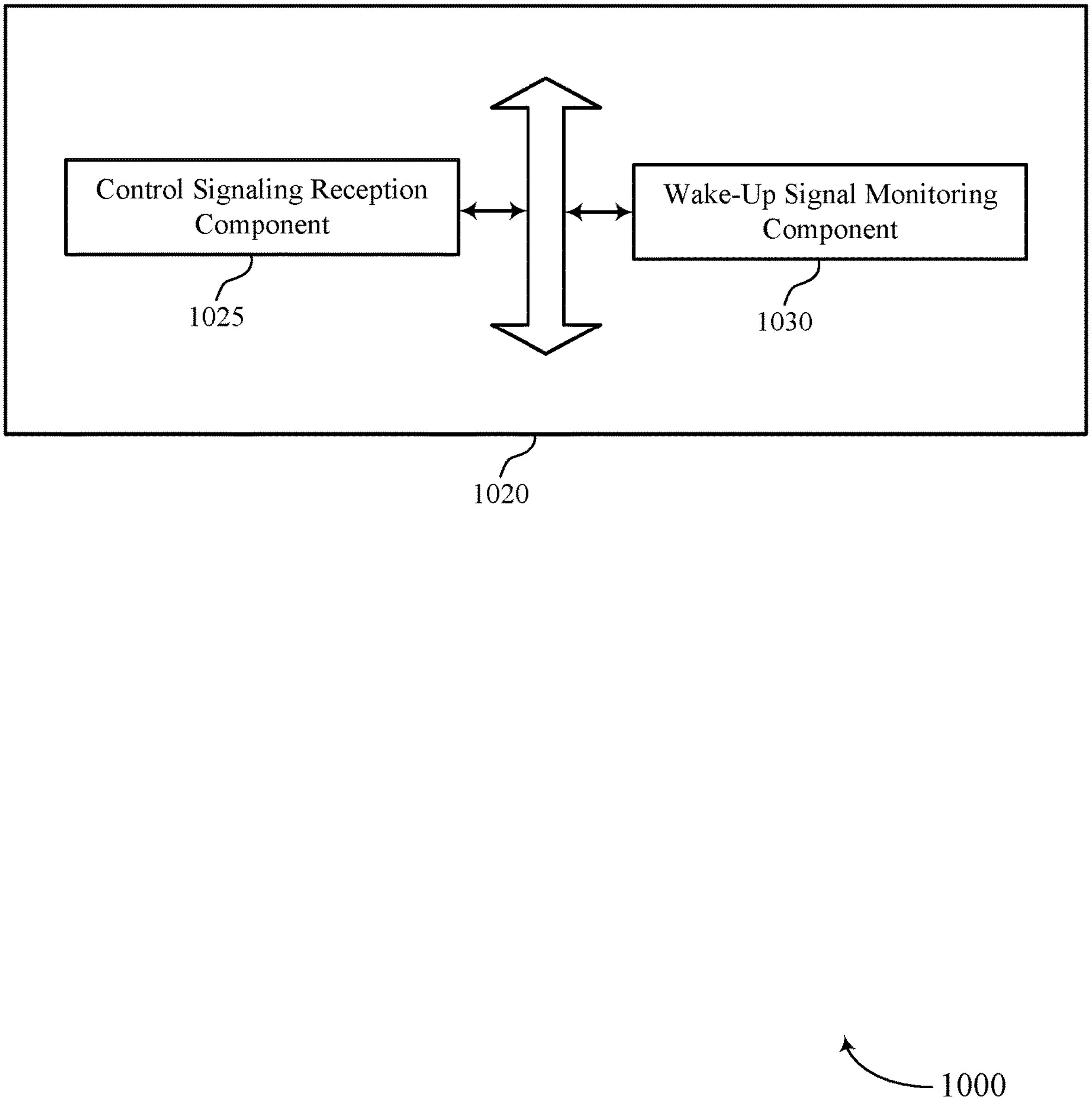
FIG. 10 shows a block diagram of a communications manager that supports DRX configurations for WUS monitoring in accordance with one or more aspects of the present disclosure.

FIG. 10 shows a block diagram 1000 of a communications manager 1020 that supports DRX configurations for WUS monitoring in accordance with one or more aspects of the present disclosure. In some examples, the multiple DRX configurations may be multiple CDRX configurations, multiple iDRX configurations, or any combination thereof. The communications manager 1020 may be an example of aspects of a communications manager 820, a communications manager 920, or both, as described herein. The communications manager 1020, or various components thereof, may be an example of means for performing various aspects of DRX configurations for WUS monitoring as described herein. For example, the communications manager 1020 may include a control signaling reception component 1025, a WUS monitoring component 1030, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The control signaling reception component 1025 is capable of, configured to, or operable to support a means for receiving control signaling that indicates multiple discontinuous reception (DRX) configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period. The WUS monitoring component 1030 is capable of, configured to, or operable to support a means for monitoring, during the time period, the first set of WUS monitoring occasions in accordance with the first DRX configuration. In some examples, the WUS monitoring component 1030 is capable of, configured to, or operable to support a means for monitoring, during the time period, the second set of WUS monitoring occasions in accordance with the second DRX configuration.

In some examples, the first set of WUS monitoring occasions associated with the first DRX configuration have a first periodicity and the second set of WUS monitoring occasions associated with the second DRX configuration have a second periodicity, the second periodicity different than the first periodicity.

In some examples, a timeline for the first set of WUS monitoring occasions associated with the first DRX configuration is based on a first timing offset relative to a reference time and a timeline for the second set of WUS monitoring occasions associated with the second DRX configuration is based on a second timing offset relative to the reference time, the second timing offset different than the first timing offset.

In some examples, the first set of WUS monitoring occasions associated with the first DRX configuration are associated with a first timer duration and the second set of WUS monitoring occasions associated with the second DRX configuration are associated with a second timer duration, the second timer duration different than the first timer duration.

In some examples, the first timer duration and the second timer duration are for a same type of timer, the type of timer including an inactivity timer, a monitoring duration timer, an active duration timer, an offset timer, an uplink hybrid automatic repeat request timer, a downlink hybrid automatic repeat request timer, an uplink retransmission timer, or a downlink retransmission timer.

In some examples, the first set of WUS monitoring occasions associated with the first DRX configuration each have a first duration and the second set of WUS monitoring occasions associated with the second DRX configuration each have a second duration, the second duration different than the first duration.

In some examples, the monitoring component 1030 is capable of, configured to, or operable to support a means for a WUS monitoring occasion within the first set of WUS monitoring occasions associated with the first DRX configuration or the second set of WUS monitoring occasions associated with the second DRX configuration, monitoring the WUS monitoring occasion includes monitoring portions of the WUS monitoring occasion in accordance with a duty cycle or includes monitoring an entirety of the WUS monitoring occasion.

In some examples, the first set of WUS monitoring occasions associated with the first DRX configuration are associated with a first WUS index and the second set of WUS monitoring occasions associated with the second DRX configuration are associated with a second WUS index, the second WUS index different than the first WUS index. In some examples, to support a means for monitoring the first set of WUS monitoring occasions, the WUS monitoring component 1030 is capable of, configured to, or operable to support a means for monitoring for one or more first WUSs corresponding to the first WUS index. In some examples, to support a means for monitoring the second set of WUS monitoring occasions, the WUS monitoring component 1030 is capable of, configured to, or operable to support a means for monitoring for one or more second WUSs corresponding to the second WUS index.

In some examples, the first set of WUS monitoring occasions associated with the first DRX configuration are associated with a first transmission configuration indication state and the second set of WUS monitoring occasions associated with the second DRX configuration are associated with a second transmission configuration indication state, the second transmission configuration indication state different than the first transmission configuration indication state.

In some examples, the first set of WUS monitoring occasions associated with the first DRX configuration are associated with a first WUS bandwidth and the second set of WUS monitoring occasions associated with the second DRX configuration are associated with a second WUS bandwidth, the second WUS bandwidth different than the first WUS bandwidth.

In some examples, the WUS monitoring component 1030 is capable of, configured to, or operable to support a means for identifying that a first WUS monitoring occasion included in the first set of WUS monitoring occasions associated with the first DRX configuration overlaps in time with a second WUS monitoring occasion included in the second set of WUS monitoring occasions associated with the second DRX configuration. In some examples, the WUS monitoring component 1030 is capable of, configured to, or operable to support a means for monitoring the first WUS monitoring occasion, while refraining from monitoring the second WUS monitoring occasion, based on a priority of the first WUS monitoring occasion being higher than a priority of the second WUS monitoring occasion.

In some examples, the multiple DRX configurations further include a third DRX configuration associated with a third set of WUS monitoring occasions. In some examples, the third DRX configuration is also active during the time period.

In some examples, the first set of WUS monitoring occasions and the second set of WUS monitoring occasions are associated with a same frequency range.

In some examples, the UE includes a first radio and a second radio associated with lower active power consumption than the first radio. In some examples, monitoring at least one of the first set of WUS monitoring occasions and the second set of WUS monitoring occasions is via the second radio.

In some examples, the WUS monitoring component 1030 is capable of, configured to, or operable to support a means for receiving a WUS via the second radio. In some examples, the WUS monitoring component 1030 is capable of, configured to, or operable to support a means for waking up the first radio in response to receiving the WUS via the second radio.

In some examples, the WUS monitoring component 1030 is capable of, configured to, or operable to support a means for receiving second control signaling activating the first DRX configuration and the second DRX configuration for the time period.

In some examples, the WUS monitoring component 1030 is capable of, configured to, or operable to support a means for receiving third control signaling deactivating the first DRX configuration, the second DRX configuration, or both for a second time period, the second time period after the time period.

In some examples, the first DRX configuration is for first traffic associated with a first traffic pattern and one or more parameters for the first set of WUS monitoring occasions are based on the first traffic pattern. In some examples, the second DRX configuration is for second traffic associated with a second traffic pattern and one or more parameters for the second set of WUS monitoring occasions are based on the second traffic pattern, the second traffic pattern different than the first traffic pattern.

Figure 11:
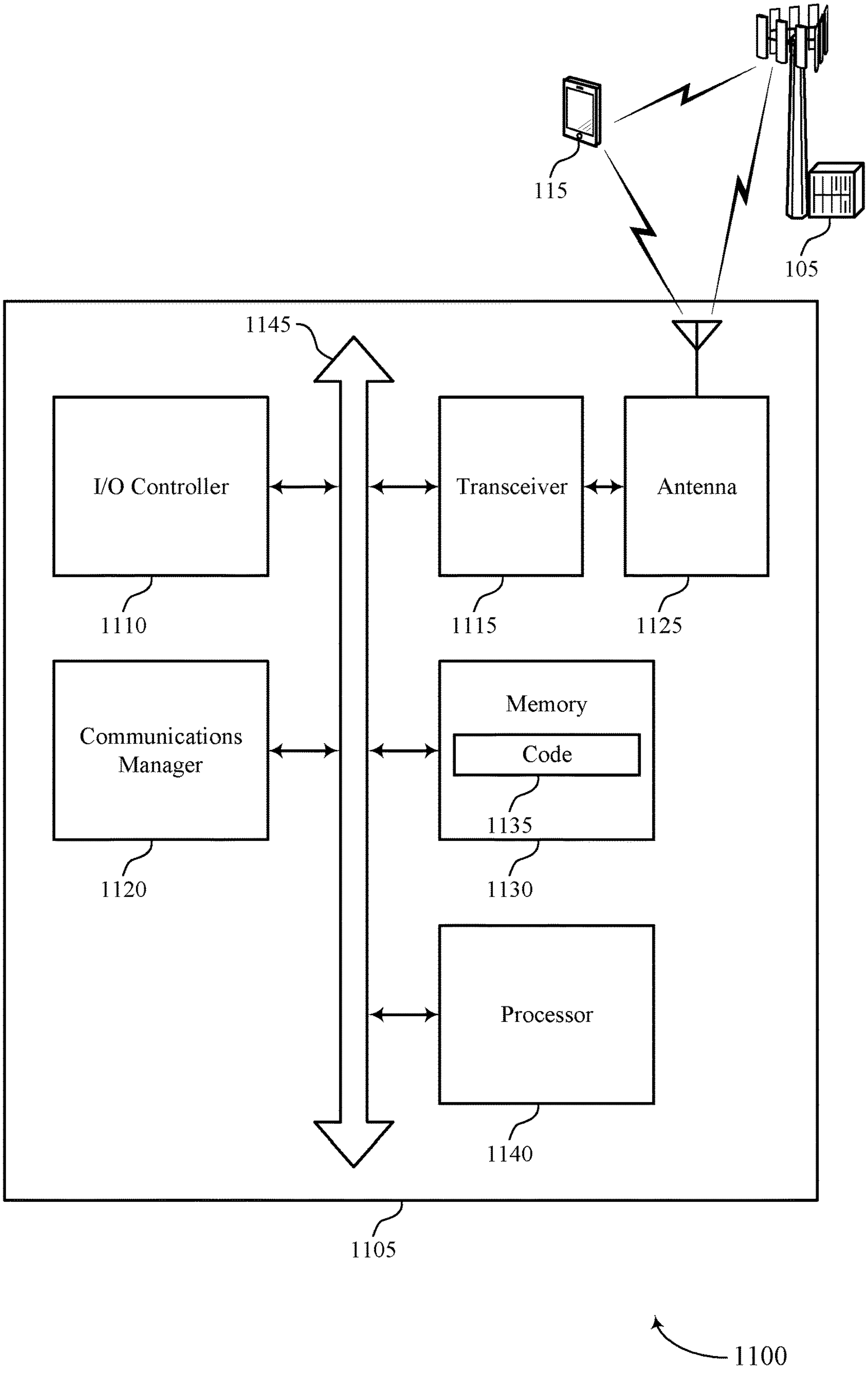
FIG. 11 shows a diagram of a system including a device that supports DRX configurations for WUS monitoring in accordance with one or more aspects of the present disclosure.

FIG. 11 shows a diagram of a system 1100 including a device 1105 that supports DRX configurations for WUS monitoring in accordance with one or more aspects of the present disclosure. In some examples, the multiple DRX configurations may be multiple CDRX configurations, multiple iDRX configurations, or any combination thereof. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140.

In some cases, a user may interact with the device 1105 via the I/O controller 1110 or via hardware components controlled by the I/O controller 1110. In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting DRX configurations for WUS monitoring). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for receiving control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period. The communications manager 1120 is capable of, configured to, or operable to support a means for monitoring, during the time period, the first set of WUS monitoring occasions in accordance with the first DRX configuration. The communications manager 1120 is capable of, configured to, or operable to support a means for monitoring, during the time period, the second set of WUS monitoring occasions in accordance with the second DRX configuration.

By including or configuring the communications manager 1120 in accordance with examples as described herein, the device 1105 may support techniques for which may result in various advantages, such as improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of DRX configurations for WUS monitoring as described herein, or the at least one processor 1140 and the at least one memory 1130 may be otherwise configured to, individually or collectively, perform or support such operations.

Figure 12:
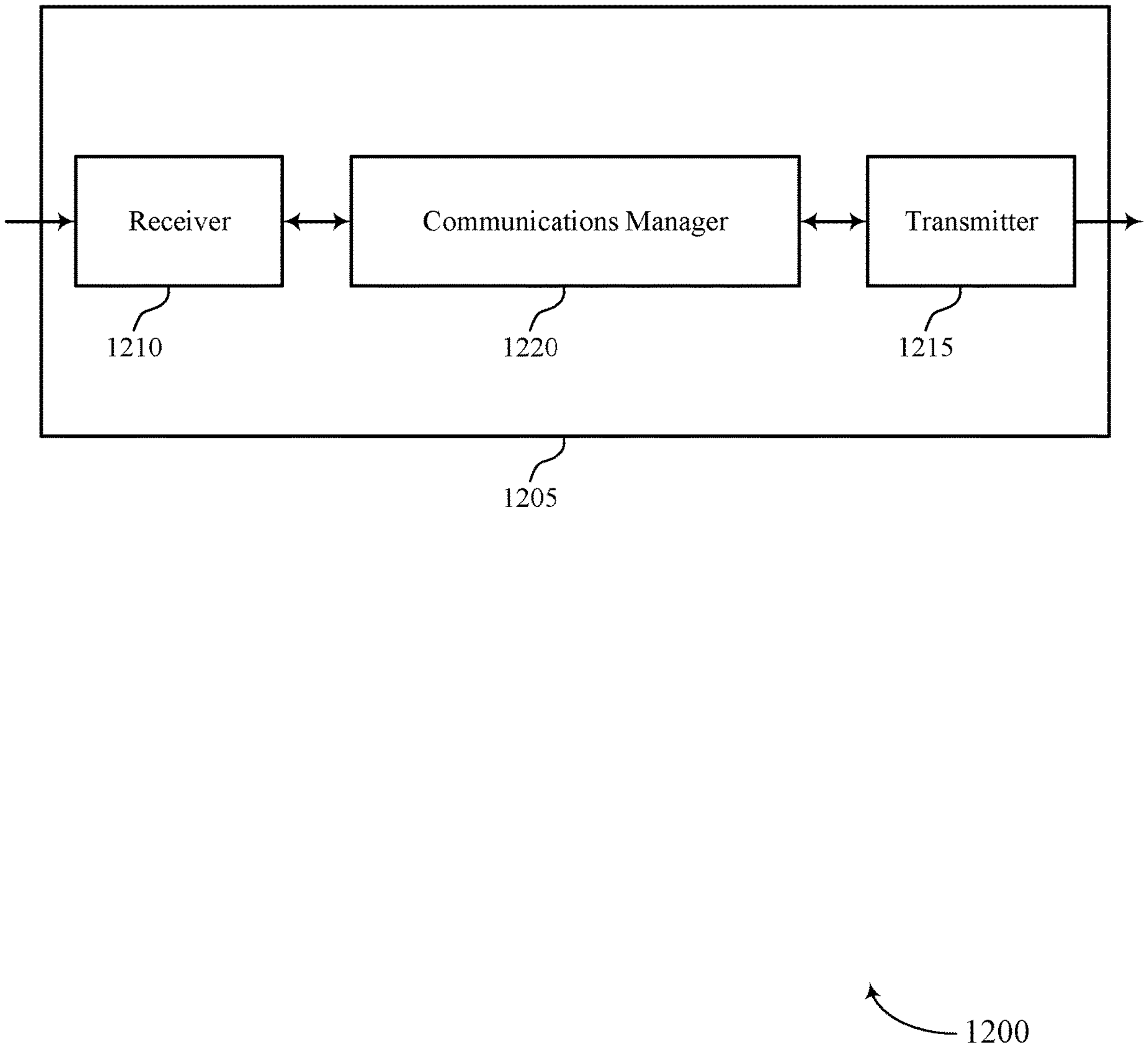
FIGS. 12 and 13 show block diagrams of devices that support DRX configurations for WUS monitoring in accordance with one or more aspects of the present disclosure.

FIG. 12 shows a block diagram 1200 of a device 1205 that supports DRX configurations for WUS monitoring in accordance with one or more aspects of the present disclosure. In some examples, the multiple DRX configurations may be multiple CDRX configurations, multiple iDRX configurations, or any combination thereof. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of DRX configurations for WUS monitoring as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period. The communications manager 1220 is capable of, configured to, or operable to support a means for outputting, during the time period, a first WUS during a first WUS monitoring occasion included in the first set of WUS monitoring occasions. The communications manager 1220 is capable of, configured to, or operable to support a means for outputting during the time period, a second WUS during a second WUS monitoring occasion included in the second set of WUS monitoring occasions.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for which may result in various advantages, such as reduced processing, reduced power consumption, and more efficient utilization of communication resources.

Figure 13:
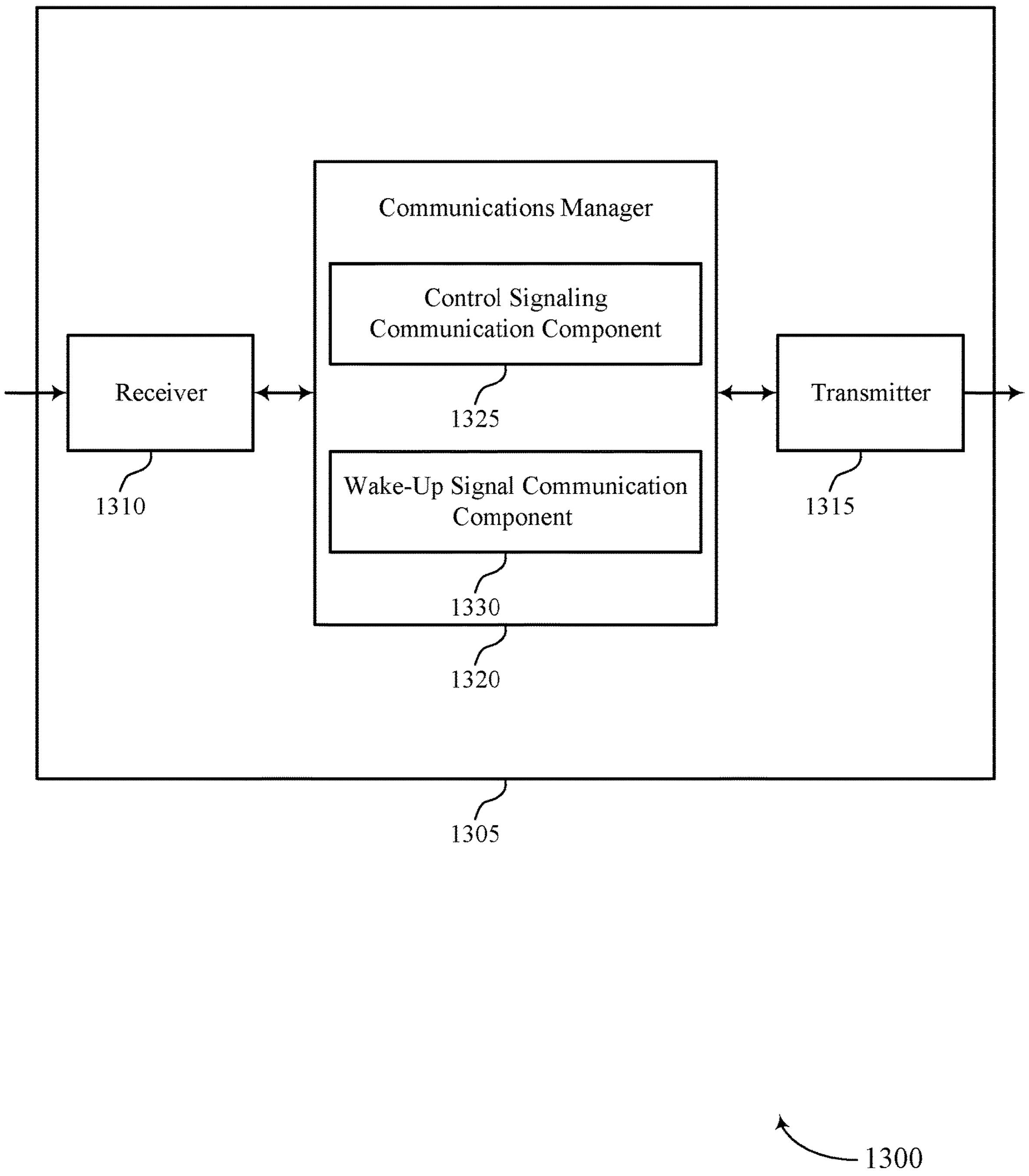

FIG. 13 shows a block diagram 1300 of a device 1305 that supports DRX configurations for WUS monitoring in accordance with one or more aspects of the present disclosure. In some examples, the multiple DRX configurations may be multiple CDRX configurations, multiple iDRX configurations, or any combination thereof. The device 1305 may be an example of aspects of a device 1205 or a network entity 105 as described herein. The device 1305 may include a receiver 1310, a transmitter 1315, and a communications manager 1320. The device 1305, or one of more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of DRX configurations for WUS monitoring as described herein. For example, the communications manager 1320 may include a control signaling communication component 1325 a WUS communication component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The control signaling communication component 1325 is capable of, configured to, or operable to support a means for outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period. The WUS communication component 1330 is capable of, configured to, or operable to support a means for outputting, during the time period, a first WUS during a first WUS monitoring occasion included in the first set of WUS monitoring occasions. The WUS communication component 1330 is capable of, configured to, or operable to support a means for outputting during the time period, a second WUS during a second WUS monitoring occasion included in the second set of WUS monitoring occasions.

Figure 14:
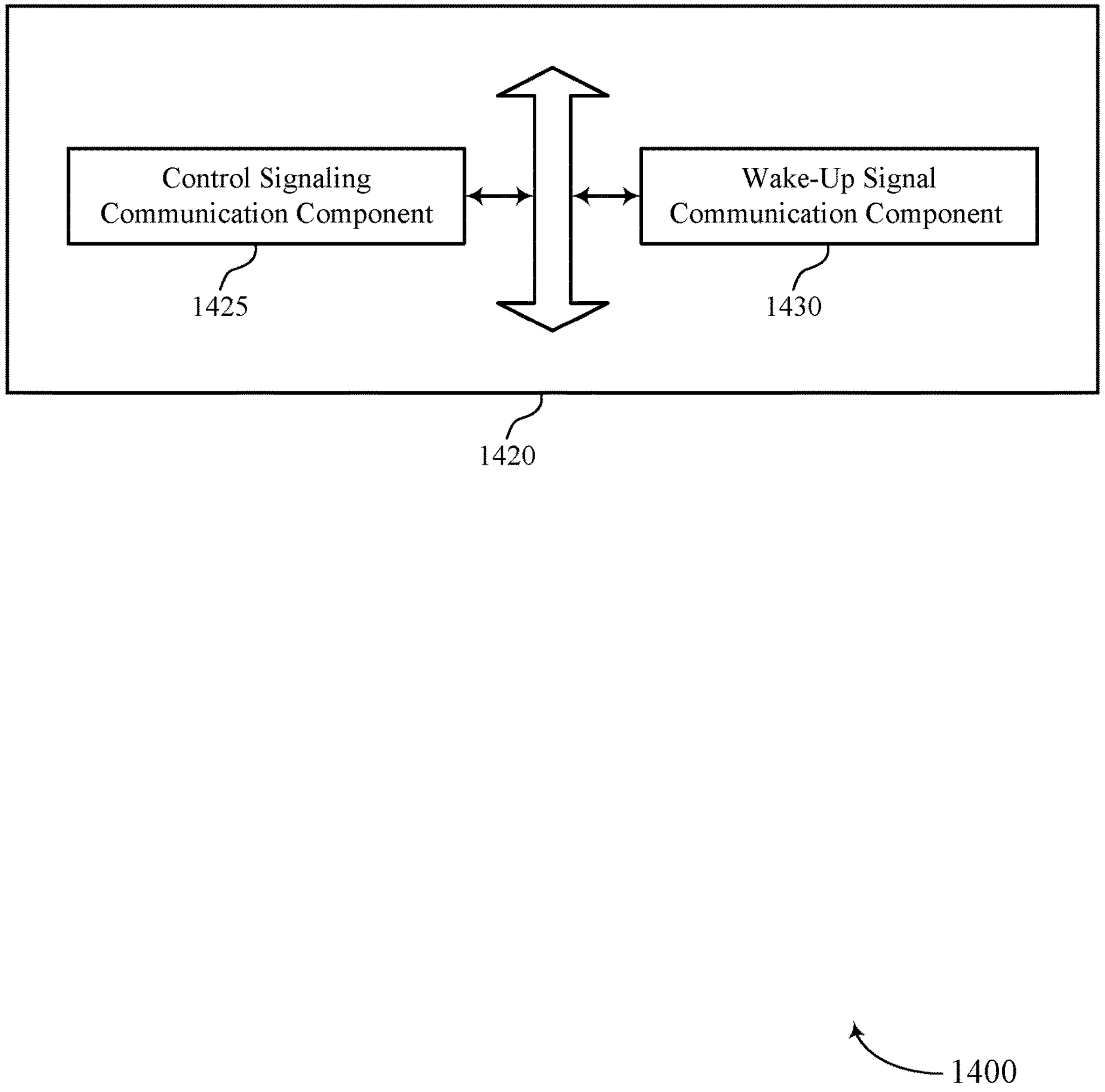
FIG. 14 shows a block diagram of a communications manager that supports DRX configurations for WUS monitoring in accordance with one or more aspects of the present disclosure.

FIG. 14 shows a block diagram 1400 of a communications manager 1420 that supports DRX configurations for WUS monitoring in accordance with one or more aspects of the present disclosure. In some examples, the multiple DRX configurations may be multiple CDRX configurations, multiple iDRX configurations, or any combination thereof. The communications manager 1420 may be an example of aspects of a communications manager 1220, a communications manager 1320, or both, as described herein. The communications manager 1420, or various components thereof, may be an example of means for performing various aspects of DRX configurations for WUS monitoring as described herein. For example, the communications manager 1420 may include a control signaling communication component 1425 a WUS communication component 1430, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications in accordance with examples as disclosed herein. The control signaling communication component 1425 is capable of, configured to, or operable to support a means for outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period. The WUS communication component 1430 is capable of, configured to, or operable to support a means for outputting, during the time period, a first WUS during a first WUS monitoring occasion included in the first set of WUS monitoring occasions. In some examples, the WUS communication component 1430 is capable of, configured to, or operable to support a means for outputting during the time period, a second WUS during a second WUS monitoring occasion included in the second set of WUS monitoring occasions.

In some examples, the first set of WUS monitoring occasions associated with the first DRX configuration have a first periodicity and the second set of WUS monitoring occasions associated with the second DRX configuration have a second periodicity, the second periodicity different than the first periodicity.

In some examples, a timeline for the first set of WUS monitoring occasions associated with the first DRX configuration is based on a first timing offset relative to a reference time and a timeline for the second set of WUS monitoring occasions associated with the second DRX configuration is based on a second timing offset relative to the reference time, the second timing offset different than the first timing offset.

In some examples, the first set of WUS monitoring occasions associated with the first DRX configuration are associated with a first timer duration and the second set of WUS monitoring occasions associated with the second DRX configuration are associated with a second timer duration, the second timer duration different than the first timer duration.

In some examples, the first timer duration and the second timer duration are for a same type of timer, the type of timer including an inactivity timer, a monitoring duration timer, an active duration timer, an offset timer, or a retransmission timer.

In some examples, the first set of WUS monitoring occasions associated with the first DRX configuration each have a first duration and the second set of WUS monitoring occasions associated with the second DRX configuration each have a second duration, the second duration different than the first duration.

In some examples, for a WUS monitoring occasion within the first set of WUS monitoring occasions associated with the first DRX configuration or the second set of WUS monitoring occasions associated with the second DRX configuration, monitoring the WUS monitoring occasion includes monitoring portions of the WUS monitoring occasion in accordance with a duty cycle or includes monitoring an entirety of the WUS monitoring occasion.

In some examples, the first set of WUS monitoring occasions associated with the first DRX configuration are associated with a first WUS index and the second set of WUS monitoring occasions associated with the second DRX configuration are associated with a second WUS index, the second WUS index different than the first WUS index.

In some examples, the first set of WUS monitoring occasions associated with the first DRX configuration are associated with a first transmission configuration indication state and the second set of WUS monitoring occasions associated with the second DRX configuration are associated with a second transmission configuration indication state, the second transmission configuration indication state different than the first transmission configuration indication state.

In some examples, the first set of WUS monitoring occasions associated with the first DRX configuration are associated with a first WUS bandwidth and the second set of WUS monitoring occasions associated with the second DRX configuration are associated with a second WUS bandwidth, the second WUS bandwidth different than the first WUS bandwidth.

In some examples, the first set of WUS monitoring occasions associated with the first DRX configuration are associated with a first priority and the second set of WUS monitoring occasions associated with the second DRX configuration are associated with a second priority, the second priority different than the first priority.

In some examples, the multiple DRX configurations further include a third DRX configuration associated with a third set of WUS monitoring occasions. In some examples, the third DRX configuration is also active during the time period.

In some examples, the first set of WUS monitoring occasions and the second set of WUS monitoring occasions are associated with a same frequency range.

In some examples, the WUS communication component 1430, is capable of, configured to, or operable to support a means for outputting second control signaling activating the first DRX configuration and the second DRX configuration for the time period.

In some examples, the WUS communication component 1430 is capable of, configured to, or operable to support a means for outputting third control signaling deactivating the first DRX configuration, the second DRX configuration, or both for a second time period, the second time period after the time period.

In some examples, the first DRX configuration is for first traffic associated with a first traffic pattern and one or more parameters for the first set of WUS monitoring occasions are based on the first traffic pattern. In some examples, the second DRX configuration is for second traffic associated with a second traffic pattern and one or more parameters for the second set of WUS monitoring occasions are based on the second traffic pattern, the second traffic pattern different than the first traffic pattern.

Figure 15:
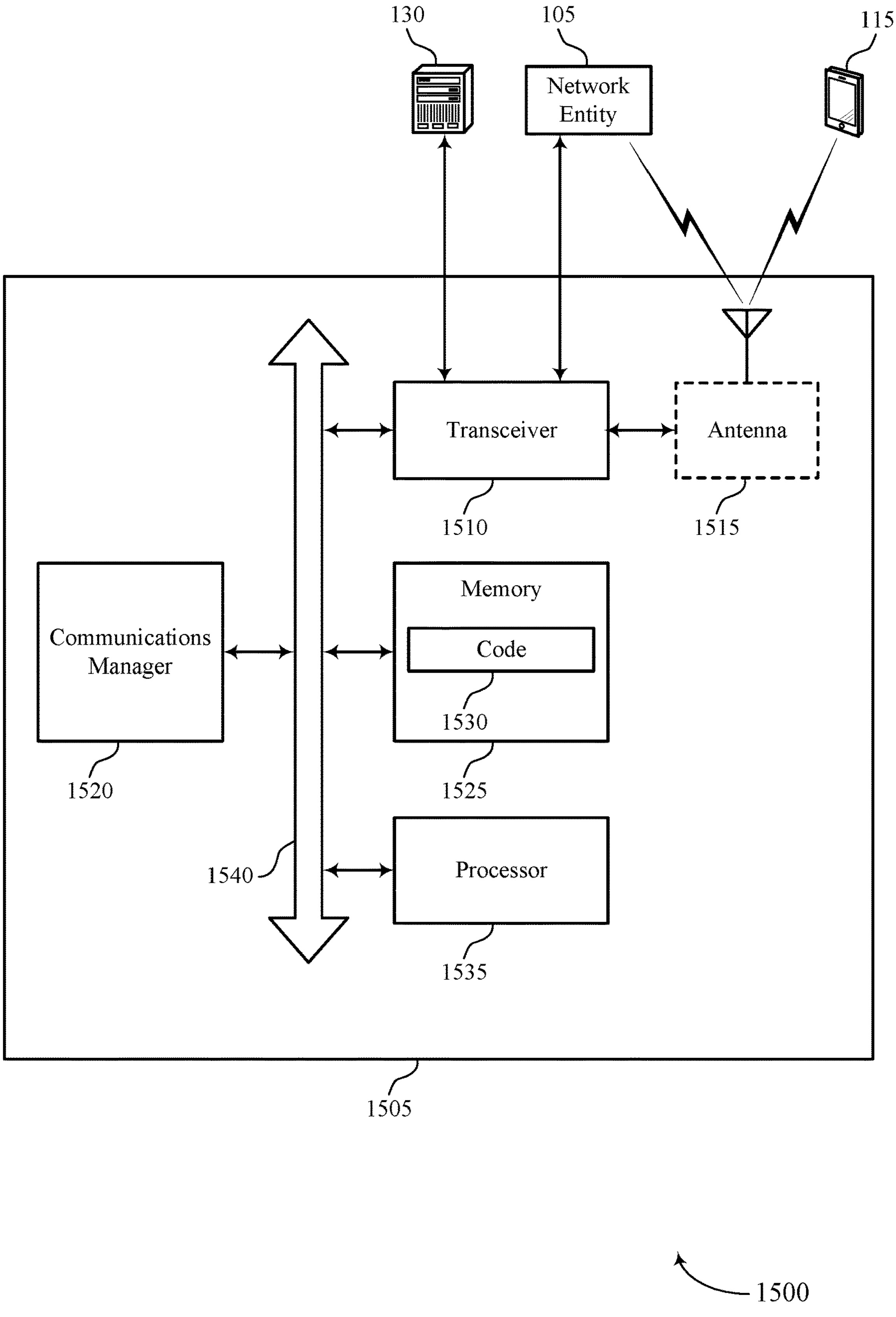
FIG. 15 shows a diagram of a system including a device that supports DRX configurations for WUS monitoring in accordance with one or more aspects of the present disclosure.

FIG. 15 shows a diagram of a system 1500 including a device 1505 that supports DRX configurations for WUS monitoring in accordance with one or more aspects of the present disclosure. In some examples, the multiple DRX configurations may be multiple CDRX configurations, multiple iDRX configurations, or any combination thereof. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting DRX configurations for WUS monitoring). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. For example, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications in accordance with examples as disclosed herein. For example, the communications manager 1520 is capable of, configured to, or operable to support a means for outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period. The communications manager 1520 is capable of, configured to, or operable to support a means for outputting, during the time period, a first WUS during a first WUS monitoring occasion included in the first set of WUS monitoring occasions. The communications manager 1520 is capable of, configured to, or operable to support a means for outputting during the time period, a second WUS during a second WUS monitoring occasion included in the second set of WUS monitoring occasions.

By including or configuring the communications manager 1520 in accordance with examples as described herein, the device 1505 may support techniques for which may result in various advantages, such as improved communication reliability, reduced latency, improved user experience related to reduced processing, reduced power consumption, more efficient utilization of communication resources, improved coordination between devices, longer battery life, and improved utilization of processing capability.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of DRX configurations for WUS monitoring as described herein, or the at least one processor 1535 and the at least one memory 1525 may be otherwise configured to, individually or collectively, perform or support such operations.

Figure 16:
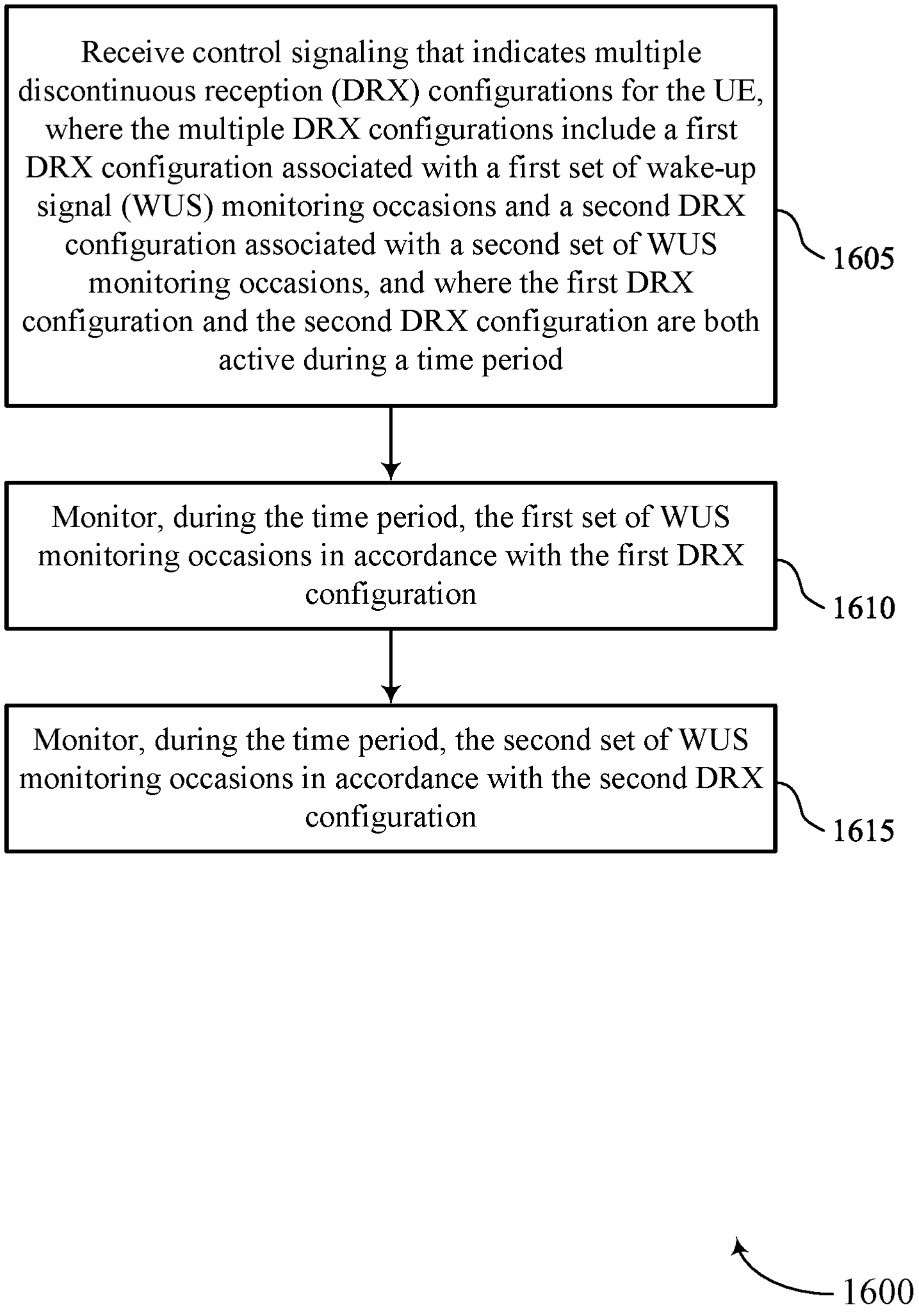
FIGS. 16 and 17 show flowcharts illustrating methods that support DRX configurations for WUS monitoring in accordance with one or more aspects of the present disclosure.

FIG. 16 shows a flowchart illustrating a method 1600 that supports DRX configurations for WUS monitoring in accordance with aspects of the present disclosure. In some examples, the multiple DRX configurations may be multiple CDRX configurations, multiple iDRX configurations, or any combination thereof. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that indicates multiple DRX configurations for the UE, where the multiple DRX configurations include a first DRX configuration associated with a first set of WUS monitoring occasions and a second DRX configuration associated with a second set of WUS monitoring occasions, and where the first DRX configuration and the second DRX configuration are both active during a time period. The operations of block 1605 may be performed in accordance with examples as disclosed herein. In some examples, aspects of the operations of 1605 may be performed by a control signaling reception component 1025 as described with reference to FIG. 10.

At 1610, the method may include monitoring, during the time period, the first set of WUS monitoring occasions in accordance with the first DRX configuration. The operations of block 1610 may be performed in accordance with examples as disclosed herein. In some examples, aspects of the operations of 1610 may be performed by a WUS monitoring component 1030 as described with reference to FIG. 10.

At 1615, the method may include monitoring, during the time period, the second set of WUS monitoring occasions in accordance with the second DRX configuration. The operations of block 1615 may be performed in accordance with examples as disclosed herein. In some examples, aspects of the operations of 1615 may be performed by a WUS monitoring component 1030 as described with reference to FIG. 10.

Figure 17:
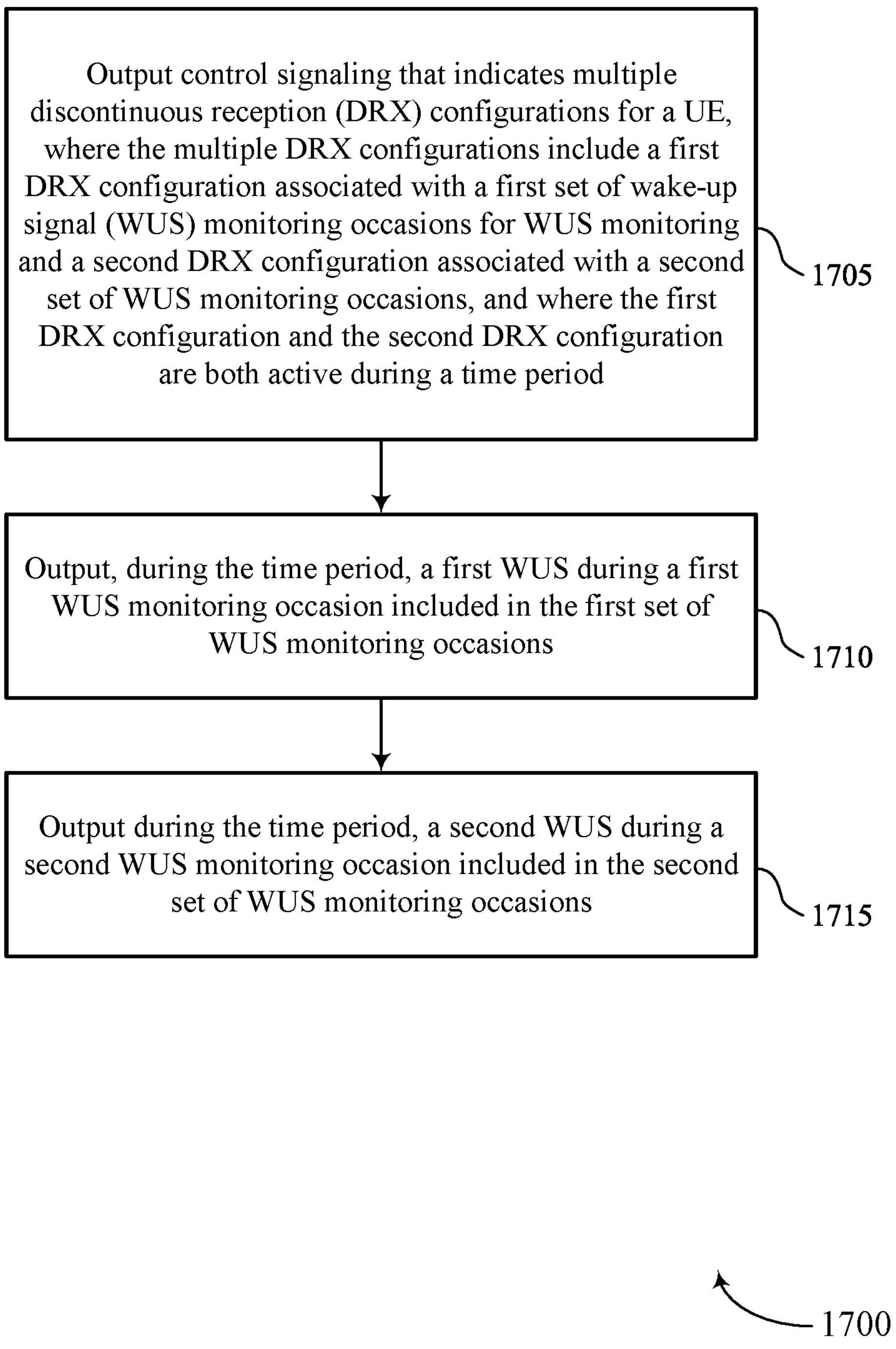

FIG. 17 shows a flowchart illustrating a method 1700 that supports DRX configurations for WUS monitoring in accordance with aspects of the present disclosure. In some examples, the multiple DRX configurations may be multiple CDRX configurations, multiple iDRX configurations, or any combination thereof. The operations of the method 1700 may be implemented by a network entity or its components as described herein. For example, the operations of the method 1700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling that indicates multiple DRX configurations for a UE, where the multiple DRX configurations include a first DRX configuration associated with a first set of WUS monitoring occasions for WUS monitoring and a second DRX configuration associated with a second set of WUS monitoring occasions, and where the first DRX configuration and the second DRX configuration are both active during a time period. The operations of block 1705 may be performed in accordance with examples as disclosed herein. In some examples, aspects of the operations of 1705 may be performed by a control signaling communication component 1425 as described with reference to FIG. 14.

At 1710, the method may include outputting, during the time period, a first WUS during a first WUS monitoring occasion included in the first set of WUS monitoring occasions. The operations of block 1710 may be performed in accordance with examples as disclosed herein. In some examples, aspects of the operations of 1710 may be performed by a WUS communication component 1430 as described with reference to FIG. 14.

At 1715, the method may include outputting during the time period, a second WUS during a second WUS monitoring occasion included in the second set of WUS monitoring occasions. The operations of block 1715 may be performed in accordance with examples as disclosed herein. In some examples, aspects of the operations of 1715 may be performed by a WUS communication component 1430 as described with reference to FIG. 14.

The following provides an overview of aspects of the present disclosure:

Aspect 1: A method for wireless communications at a UE, comprising: receiving control signaling that indicates multiple DRX configurations for the UE, wherein the multiple DRX configurations comprise a first DRX configuration associated with a first set of wake-up signal monitoring occasions and a second DRX configuration associated with a second set of wake-up signal monitoring occasions, and wherein the first DRX configuration and the second DRX configuration are both active during a time period; monitoring, during the time period, the first set of wake-up signal monitoring occasions in accordance with the first DRX configuration; and monitoring, during the time period, the second set of wake-up signal monitoring occasions in accordance with the first DRX configuration.

Aspect 2: The method of aspect 1, wherein the first set of wake-up signal monitoring occasions associated with the first DRX configuration have a first periodicity and the second set of wake-up signal monitoring occasions associated with the second DRX configuration have a second periodicity, the second periodicity different than the first periodicity.

Aspect 3: The method of any of aspects 1 through 2, wherein a timeline for the first set of wake-up signal monitoring occasions associated with the first DRX configuration is based at least in part on a first timing offset relative to a reference time and a timeline for the second set of wake-up signal monitoring occasions associated with the second DRX configuration is based at least in part on a second timing offset relative to the reference time, the second timing offset different than the first timing offset.

Aspect 4: The method of any of aspects 1 through 3, wherein the first set of wake-up signal monitoring occasions associated with the first DRX configuration are associated with a first timer duration and the second set of wake-up signal monitoring occasions associated with the second DRX configuration are associated with a second timer duration, the second timer duration different than the first timer duration.

Aspect 5: The method of aspect 4, wherein the first timer duration and the second timer duration are for a same type of timer, the type of timer comprising an inactivity timer, a monitoring duration timer, an active duration timer, an offset timer, an uplink hybrid automatic repeat request timer, a downlink hybrid automatic repeat request timer, an uplink retransmission timer, or a downlink retransmission timer.

Aspect 6: The method of any of aspects 1 through 5, wherein the first set of wake-up signal monitoring occasions associated with the first DRX configuration each have a first duration and the second set of wake-up signal monitoring occasions associated with the second DRX configuration each have a second duration, the second duration different than the first duration.

Aspect 7: The method of any of aspects 1 through 6, wherein the first set of wake-up signal monitoring occasions associated with the first DRX configuration are associated with a first wake-up signal index and the second set of wake-up signal monitoring occasions associated with the second DRX configuration are associated with a second wake-up signal index, the second wake-up signal index different than the first wake-up signal index; monitoring the first set of wake-up signal monitoring occasions comprises monitoring for one or more first wake-up signals corresponding to the first wake-up signal index; and monitoring the second set of wake-up signal monitoring occasions comprises monitoring for one or more second wake-up signals corresponding to the second wake-up signal index.

Aspect 8: The method of any of aspects 1 through 7, wherein the first set of wake-up signal monitoring occasions associated with the first DRX configuration are associated with a first transmission configuration indication state and the second set of wake-up signal monitoring occasions associated with the second DRX configuration are associated with a second transmission configuration indication state, the second transmission configuration indication state different than the first transmission configuration indication state.

Aspect 9: The method of any of aspects 1 through 8, wherein the first set of wake-up signal monitoring occasions associated with the first DRX configuration are associated with a first wake-up signal bandwidth and the second set of wake-up signal monitoring occasions associated with the second DRX configuration are associated with a second wake-up signal bandwidth, the second wake-up signal bandwidth different than the first wake-up signal bandwidth.

Aspect 10: The method of any of aspects 1 through 9, further comprising: identifying that a first wake-up signal monitoring occasion included in the first set of wake-up signal monitoring occasions associated with the first DRX configuration overlaps in time with a second wake-up signal monitoring occasion included in the second set of wake-up signal monitoring occasions associated with the second DRX configuration; and monitoring the first wake-up signal monitoring occasion, while refraining from monitoring the second wake-up signal monitoring occasion, based at least in part on a priority of the first wake-up signal monitoring occasion being higher than a priority of the second wake-up signal monitoring occasion.

Aspect 11: The method of any of aspects 1 through 10, wherein the multiple DRX configurations further comprise a third DRX configuration associated with a third set of wake-up signal monitoring occasions, and the third DRX configuration is also active during the time period.

Aspect 12: The method of any of aspects 1 through 11, wherein the first set of occasions and the second set of occasions are associated with a same frequency range.

Aspect 13: The method of any of aspects 1 through 12, wherein the UE comprises a first radio and a second radio associated with lower active power consumption than the first radio, and monitoring at least one of the first set of occasions and the second set of occasions is via the second radio.

Aspect 14: The method of aspect 13, further comprising: receiving a wake-up signal via the second radio; and waking up the first radio in response to receiving the wake-up signal via the second radio.

Aspect 15: The method of any of aspects 1 through 14, further comprising: receiving second control signaling activating the first DRX configuration and the second DRX configuration for the time period.

Aspect 16: The method of any of aspects 1 through 15, further comprising: receiving third control signaling deactivating the first DRX configuration, the second DRX configuration, or both for a second time period, the second time period after the time period.

Aspect 17: The method of any of aspects 1 through 16, wherein the first DRX configuration is for first traffic associated with a first traffic pattern and one or more parameters for the first set of occasions are based at least in part on the first traffic pattern; and the second DRX configuration is for second traffic associated with a second traffic pattern and one or more parameters for the second set of occasions are based at least in part on the second traffic pattern, the second traffic pattern different than the first traffic pattern.

Aspect 18: A method for wireless communications at a network entity, comprising: outputting control signaling that indicates multiple DRX configurations for a UE, wherein the multiple DRX configurations comprise a first DRX configuration associated with a first set of wake-up signal monitoring occasions for wake-up signal monitoring and a second DRX configuration associated with a second set of wake-up signal monitoring occasions, and wherein the first DRX configuration and the second DRX configuration are both active during a time period; outputting, during the time period, a first wake-up signal during a first wake-up signal monitoring occasion included in the first set of wake-up signal monitoring occasions; and outputting during the time period, a second wake-up signal during a second wake-up signal monitoring occasion included in the second set of wake-up signal monitoring occasions.

Aspect 19: The method of aspect 18, wherein the first set of wake-up signal monitoring occasions associated with the first DRX configuration have a first periodicity and the second set of wake-up signal monitoring occasions associated with the second DRX configuration have a second periodicity, the second periodicity different than the first periodicity.

Aspect 20: The method of any of aspects 18 through 19, wherein a timeline for the first set of wake-up signal monitoring occasions associated with the first DRX configuration is based at least in part on a first timing offset relative to a reference time and a timeline for the second set of wake-up signal monitoring occasions associated with the second DRX configuration is based at least in part on a second timing offset relative to the reference time, the second timing offset different than the first timing offset.

Aspect 21: The method of any of aspects 18 through 20, wherein the first set of wake-up signal monitoring occasions associated with the first DRX configuration are associated with a first timer duration and the second set of wake-up signal monitoring occasions associated with the second DRX configuration are associated with a second timer duration, the second timer duration different than the first timer duration.

Aspect 22: The method of any of aspects 18 through 21, wherein the first timer duration and the second timer duration are for a same type of timer, the type of timer comprising an inactivity timer, a monitoring duration timer, an active duration timer, an offset timer, or a retransmission timer.

Aspect 23: The method of any of aspects 18 through 22, wherein the first set of wake-up signal monitoring occasions associated with the first DRX configuration each have a first duration and the second set of wake-up signal monitoring occasions associated with the second DRX configuration each have a second duration, the second duration different than the first duration.

Aspect 24: The method of any of aspects 18 through 23, wherein the first set of wake-up signal monitoring occasions associated with the first DRX configuration are associated with a first wake-up signal index and the second set of wake-up signal monitoring occasions associated with the second DRX configuration are associated with a second wake-up signal index, the second wake-up signal index different than the first wake-up signal index.

Aspect 25: The method of any of aspects 18 through 24, wherein the first set of wake-up signal monitoring occasions associated with the first DRX configuration are associated with a first transmission configuration indication state and the second set of wake-up signal monitoring occasions associated with the second DRX configuration are associated with a second transmission configuration indication state, the second transmission configuration indication state different than the first transmission configuration indication state.

Aspect 26: The method of any of aspects 18 through 25, wherein the first set of wake-up signal monitoring occasions associated with the first DRX configuration are associated with a first wake-up signal bandwidth and the second set of wake-up signal monitoring occasions associated with the second DRX configuration are associated with a second wake-up signal bandwidth, the second wake-up signal bandwidth different than the first wake-up signal bandwidth.

Aspect 27: The method of any of aspects 18 through 26, wherein the first set of wake-up signal monitoring occasions associated with the first DRX configuration are associated with a first priority and the second set of wake-up signal monitoring occasions associated with the second DRX configuration are associated with a second priority, the second priority different than the first priority.

Aspect 28: The method of any of aspects 18 through 27, wherein the multiple DRX configurations further comprise a third DRX configuration associated with a third set of wake-up signal monitoring occasions, and the third DRX configuration is also active during the time period.

Aspect 29: The method of any of aspects 18 through 28, wherein the first set of occasions and the second set of occasions are associated with a same frequency range.

Aspect 30: The method of any of aspects 18 through 29, further comprising: outputting second control signaling activating the first DRX configuration and the second DRX configuration for the time period.

Aspect 31: The method of any of aspects 18 through 30, further comprising: outputting third control signaling deactivating the first DRX configuration, the second DRX configuration, or both for a second time period, the second time period after the time period.

Aspect 32: The method of any of aspects 18 through 31, wherein the first DRX configuration is for first traffic associated with a first traffic pattern and one or more parameters for the first set of occasions are based at least in part on the first traffic pattern; and the second DRX configuration is for second traffic associated with a second traffic pattern and one or more parameters for the second set of occasions are based at least in part on the second traffic pattern, the second traffic pattern different than the first traffic pattern.

Aspect 33: A UE for wireless communications, comprising one or more memories storing processor-executable code, and one or more processors coupled with the one or more memories and individually or collectively operable to execute the code to cause the UE to perform a method of any of aspects 1 through 17.

Aspect 34: A UE for wireless communications, comprising at least one means for performing a method of any of aspects 1 through 17.

Aspect 35: A non-transitory computer-readable medium storing code for wireless communications, the code comprising instructions executable by one or more processors to perform a method of any of aspects 1 through 17.

Aspect 36: A network entity for wireless communications, comprising one or more memories storing processor-executable code, and one or more processors coupled with the one or more memories and individually or collectively operable to execute the code to cause the network entity to perform a method of any of aspects 18 through 32.

Aspect 37: A network entity for wireless communications, comprising at least one means for performing a method of any of aspects 18 through 32.

Aspect 38: A non-transitory computer-readable medium storing code for wireless communications, the code comprising instructions executable by one or more processors to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - receive control signaling that indicates multiple discontinuous reception (DRX) configurations for the UE, wherein the multiple DRX configurations comprise a first DRX configuration associated with a first set of wake-up signal monitoring occasions and a second DRX configuration associated with a second set of wake-up signal monitoring occasions, and wherein the first DRX configuration and the second DRX configuration are both active during a time period;
  - monitor, during the time period, the first set of wake-up signal monitoring occasions in accordance with the first DRX configuration; and
  - monitor, during the time period, the second set of wake-up signal monitoring occasions in accordance with the second DRX configuration.

2. The UE of claim 1, wherein the first set of wake-up signal monitoring occasions associated with the first DRX configuration have a first periodicity and the second set of wake-up signal monitoring occasions associated with the second DRX configuration have a second periodicity, the second periodicity different than the first periodicity.

3. The UE of claim 1, wherein a timeline for the first set of wake-up signal monitoring occasions associated with the first DRX configuration is based at least in part on a first timing offset relative to a reference time and a timeline for the second set of wake-up signal monitoring occasions associated with the second DRX configuration is based at least in part on a second timing offset relative to the reference time, the second timing offset different than the first timing offset.

4. The UE of claim 1, wherein the first set of wake-up signal monitoring occasions associated with the first DRX configuration are associated with a first timer duration and the second set of wake-up signal monitoring occasions associated with the second DRX configuration are associated with a second timer duration, the second timer duration different than the first timer duration.

5. The UE of claim 4, wherein the first timer duration and the second timer duration are for a same type of timer, the type of timer comprising an inactivity timer, a monitoring duration timer, an active duration timer, an offset timer, an uplink hybrid automatic repeat request timer, a downlink hybrid automatic repeat request timer, an uplink retransmission timer, or a downlink retransmission timer.

6. The UE of claim 1, wherein the first set of wake-up signal monitoring occasions associated with the first DRX configuration each have a first duration and the second set of wake-up signal monitoring occasions associated with the second DRX configuration each have a second duration, the second duration different than the first duration.

7. The UE of claim 1, wherein:

the first set of wake-up signal monitoring occasions associated with the first DRX configuration are associated with a first wake-up signal index and the second set of wake-up signal monitoring occasions associated with the second DRX configuration are associated with a second wake-up signal index, the second wake-up signal index different than the first wake-up signal index;

to monitor the first set of wake-up signal monitoring occasions, the one or more processors are individually or collectively operable to execute the code to cause the UE to monitor for one or more first wake-up signals corresponding to the first wake-up signal index; and to monitor the second set of wake-up signal monitoring occasions, the one or more processors are individually or collectively operable to execute the code to cause the UE to monitor for one or more second wake-up signals corresponding to the second wake-up signal index.

8. The UE of claim 1, wherein the first set of wake-up signal monitoring occasions associated with the first DRX configuration are associated with a first transmission configuration indication state and the second set of wake-up signal monitoring occasions associated with the second DRX configuration are associated with a second transmission configuration indication state, the second transmission configuration indication state different than the first transmission configuration indication state.

9. The UE of claim 1, wherein the first set of wake-up signal monitoring occasions associated with the first DRX configuration are associated with a first wake-up signal bandwidth and the second set of wake-up signal monitoring occasions associated with the second DRX configuration are associated with a second wake-up signal bandwidth, the second wake-up signal bandwidth different than the first wake-up signal bandwidth.

10. The UE of claim 1, wherein the one or more processors are individually or collectively further operable to execute the code to cause the UE to:

identify that a first wake-up signal monitoring occasion included in the first set of wake-up signal monitoring occasions associated with the first DRX configuration overlaps in time with a second wake-up signal monitoring occasion included in the second set of wake-up signal monitoring occasions associated with the second DRX configuration; and monitor the first wake-up signal monitoring occasion, while refraining from monitoring the second wake-up signal monitoring occasion, based at least in part on a priority of the first wake-up signal monitoring occasion being higher than a priority of the second wake-up signal monitoring occasion.

11. The UE of claim 1, wherein:

the multiple DRX configurations further comprise a third DRX configuration associated with a third set of wake-up signal monitoring occasions, and the third DRX configuration is also active during the time period.

12. The UE of claim 1, wherein the first set of wake-up signal monitoring occasions and the second set of wake-up signal monitoring occasions are associated with a same frequency range.

13. The UE of claim 1, wherein:

the UE comprises a first radio and a second radio associated with lower active power consumption than the first radio, and the one or more processors are individually or collectively operable to execute the code to cause the UE to monitor at least one of the first set of wake-up signal monitoring occasions and the second set of wake-up signal monitoring occasions via the second radio.

14. The UE of claim 13, wherein the one or more processors are individually or collectively further operable to execute the code to cause the UE to:

receive a wake-up signal via the second radio; and wake up the first radio in response to receiving the wake-up signal via the second radio.

15. The UE of claim 1, wherein the one or more processors are individually or collectively further operable to execute the code to cause the UE to:

receive second control signaling activating the first DRX configuration and the second DRX configuration for the time period.

16. The UE of claim 1, wherein the one or more processors are individually or collectively further operable to execute the code to cause the UE to:

receive third control signaling deactivating the first DRX configuration, the second DRX configuration, or both for a second time period, the second time period after the time period.

17. The UE of claim 1, wherein:

the first DRX configuration is for first traffic associated with a first traffic pattern and one or more parameters for the first set of wake-up signal monitoring occasions are based at least in part on the first traffic pattern; and the second DRX configuration is for second traffic associated with a second traffic pattern and one or more parameters for the second set of wake-up signal monitoring occasions are based at least in part on the second traffic pattern, the second traffic pattern different than the first traffic pattern.

18. A network entity, comprising:

one or more memories storing processor-executable code; and one or more processors coupled with the one or more memories and individually or collectively operable to execute the code to cause the network entity to:

output control signaling that indicates multiple discontinuous reception (DRX) configurations for a user equipment (UE), wherein the multiple DRX configurations comprise a first DRX configuration associated with a first set of wake-up signal monitoring occasions for wake-up signal monitoring and a second DRX configuration associated with a second set of wake-up signal monitoring occasions, and wherein the first DRX configuration and the second DRX configuration are both active during a time period;

output, during the time period, a first wake-up signal during a first wake-up signal monitoring occasion included in the first set of wake-up signal monitoring occasions; and output during the time period, a second wake-up signal during a second wake-up signal monitoring occasion included in the second set of wake-up signal monitoring occasions.

19. The network entity of claim 18, wherein the first set of wake-up signal monitoring occasions associated with the first DRX configuration have a first periodicity and the second set of wake-up signal monitoring occasions associated with the second DRX configuration have a second periodicity, the second periodicity different than the first periodicity.

20. The network entity of claim 18, wherein a timeline for the first set of wake-up signal monitoring occasions associated with the first DRX configuration is based at least in part on a first timing offset relative to a reference time and a timeline for the second set of wake-up signal monitoring occasions associated with the second DRX configuration is based at least in part on a second timing offset relative to the reference time, the second timing offset different than the first timing offset.

21. The network entity of claim 18, wherein the first set of wake-up signal monitoring occasions associated with the first DRX configuration are associated with a first timer duration and the second set of wake-up signal monitoring occasions associated with the second DRX configuration are associated with a second timer duration, the second timer duration different than the first timer duration.

22. The network entity of claim 21, wherein the first timer duration and the second timer duration are for a same type of timer, the type of timer comprising an inactivity timer, a monitoring duration timer, an active duration timer, an offset timer, or a retransmission timer.

23. The network entity of claim 18, wherein the first set of wake-up signal monitoring occasions associated with the first DRX configuration each have a first duration and the second set of wake-up signal monitoring occasions associated with the second DRX configuration each have a second duration, the second duration different than the first duration.

24. The network entity of claim 18, wherein the first set of wake-up signal monitoring occasions associated with the first DRX configuration are associated with a first wake-up signal index and the second set of wake-up signal monitoring occasions associated with the second DRX configuration are associated with a second wake-up signal index, the second wake-up signal index different than the first wake-up signal index.

25. The network entity of claim 18, wherein the first set of wake-up signal monitoring occasions associated with the first DRX configuration are associated with a first transmission configuration indication state and the second set of wake-up signal monitoring occasions associated with the second DRX configuration are associated with a second transmission configuration indication state, the second transmission configuration indication state different than the first transmission configuration indication state.

26. The network entity of claim 18, wherein the first set of wake-up signal monitoring occasions associated with the first DRX configuration are associated with a first wake-up signal bandwidth and the second set of wake-up signal monitoring occasions associated with the second DRX configuration are associated with a second wake-up signal bandwidth, the second wake-up signal bandwidth different than the first wake-up signal bandwidth.

27. The network entity of claim 18, wherein the first set of wake-up signal monitoring occasions associated with the first DRX configuration are associated with a first priority and the second set of wake-up signal monitoring occasions associated with the second DRX configuration are associated with a second priority, the second priority different than the first priority.

28. The network entity of claim 18, wherein:

the first DRX configuration is for first traffic associated with a first traffic pattern and one or more parameters for the first set of wake-up signal monitoring occasions are based at least in part on the first traffic pattern; and the second DRX configuration is for second traffic associated with a second traffic pattern and one or more parameters for the second set of wake-up signal monitoring occasions are based at least in part on the second traffic pattern, the second traffic pattern different than the first traffic pattern.

29. A method for wireless communications at a user equipment (UE), comprising:

receiving control signaling that indicates multiple discontinuous reception (DRX) configurations for the UE, wherein the multiple DRX configurations comprise a first DRX configuration associated with a first set of wake-up signal monitoring occasions and a second DRX configuration associated with a second set of wake-up signal monitoring occasions, and wherein the first DRX configuration and the second DRX configuration are both active during a time period;

monitoring, during the time period, the first set of wake-up signal monitoring occasions in accordance with the first DRX configuration; and monitoring, during the time period, the second set of wake-up signal monitoring occasions in accordance with the second DRX configuration.

30. A method for wireless communications at a network entity, comprising:

outputting control signaling that indicates multiple discontinuous reception (DRX) configurations for a user equipment (UE), wherein the multiple DRX configurations comprise a first DRX configuration associated with a first set of wake-up signal monitoring occasions for wake-up signal monitoring and a second DRX configuration associated with a second set of wake-up signal monitoring occasions, and wherein the first DRX configuration and the second DRX configuration are both active during a time period;

outputting, during the time period, a first wake-up signal during a first wake-up signal monitoring occasion included in the first set of wake-up signal monitoring occasions; and outputting during the time period, a second wake-up signal during a second wake-up signal monitoring occasion included in the second set of wake-up signal monitoring occasions.

* * * * *